(12) United States Patent
Gajula et al.

(10) Patent No.: US 11,265,068 B2
(45) Date of Patent: Mar. 1, 2022

(54) BEAM SELECTION IN HANDHELD WIRELESS COMMUNICATIONS DEVICES

(71) Applicant: QUALCOMM Incorporated, San Diego, CA (US)

(72) Inventors: Nagaraju Gajula, San Diego, CA (US); Uzma Khan Qazi, San Marcos, CA (US); Sathish Krishnamoorthy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/381,735

(22) Filed: Apr. 11, 2019

(65) Prior Publication Data

US 2020/0328797 A1 Oct. 15, 2020

(51) Int. Cl.
*H04B 7/08* (2006.01)
*H04B 17/309* (2015.01)
(Continued)

(52) U.S. Cl.
CPC ............ *H04B 7/088* (2013.01); *H04B 7/086* (2013.01); *H04B 7/0857* (2013.01);
(Continued)

(58) Field of Classification Search
CPC ...... H04B 7/088; H04B 7/086; H04B 17/309; H04B 7/0857; H04W 72/08; H04W 72/046
See application file for complete search history.

(56) References Cited

U.S. PATENT DOCUMENTS

2009/0096683 A1\* 4/2009 Rosenblatt ............ H01Q 1/242
343/702
2015/0257073 A1 9/2015 Park et al.
(Continued)

FOREIGN PATENT DOCUMENTS

WO WO-2017196612 A1 11/2017
WO WO-2018083253 A1 5/2018

OTHER PUBLICATIONS

International Search Report and Written Opinion—PCT/US2020/027647—ISA/EPO—dated Jul. 13, 2020.

*Primary Examiner* — Yaotang Wang
(74) *Attorney, Agent, or Firm* — Holland & Hart LLP

(57) ABSTRACT

Methods, systems, and devices for wireless communications are described. An example method includes performing transmission or receive beam measurements at two or more wireless antennas of a wireless device, selecting a serving beam pair based at least in part on the transmission or receive beam measurements, and presenting an indication at the wireless device corresponding to the selected serving beam pair. The method may further include detecting user obstruction of part of the selected serving beam pair. The method may also include determining that a transmission power restriction applies to a first antenna associated with the selected transmission beam based at least in part on the transmission or receive beam measurements. Other example methods may further include detecting a change in an orientation of the wireless device and performing the transmission or receive beam measurements in response to detecting the change in the orientation of the wireless device.

27 Claims, 14 Drawing Sheets

(51) Int. Cl.
*H04W 72/04* (2009.01)
*H04W 72/08* (2009.01)

(52) U.S. Cl.
CPC ......... *H04B 17/309* (2015.01); *H04W 72/046* (2013.01); *H04W 72/08* (2013.01)

(56) References Cited

U.S. PATENT DOCUMENTS

| | | |
|---|---|---|
| 2018/0167897 A1 | 6/2018 | Sampath et al. |
| 2018/0278318 A1 | 9/2018 | Chakraborty et al. |
| 2018/0302138 A1* | 10/2018 | Shirakata .................. G01S 3/74 |
| 2019/0150133 A1* | 5/2019 | Li ......................... H04W 24/10 375/224 |
| 2019/0239207 A1* | 8/2019 | Tang ..................... H04W 24/04 |
| 2020/0145090 A1* | 5/2020 | Sun ........................ H04B 7/088 |

\* cited by examiner

BEAM SELECTION IN HANDHELD WIRELESS COMMUNICATIONS DEVICES

BACKGROUND

The following relates generally to wireless communications, and more specifically to beam selection for handheld wireless communication devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless device may include one or more phasors located around the periphery of the wireless device. Each phasor may include one or more antennas that may be used for generating transmission and/or receive beams. When transmitting or receiving signals, the wireless device may select a transmission beam or a receive beam to use for communicating with another wireless device via a wireless channel. Conventional techniques for selecting transmission and/or receive beams are deficient.

SUMMARY

The described techniques relate to improved methods, systems, devices, and apparatuses that support beam selection in handheld wireless communications devices. Generally, the described techniques provide for a wireless device to indicate to a user a location of one or more antennas of the wireless device used to generate a transmission beam or a receive beam, to lessen the likelihood of the user inadvertently obstructing the one or more antennas. The techniques allow for the wireless device to select a serving beam pair that includes a transmission beam and/or a receive beam based on transmission or receive beam measurements made by the wireless device at the two or more wireless antennas. The wireless device may present an indication of the selected serving beam pair via a graphical user interface to inform the user of the location of the one or more antennas used to generate the serving beam pair. Informing the user of the location of the one or more antennas beneficially may lessen the likelihood of the user inadvertently obstructing the one or more antennas with their hand or other obstruction. In some examples, the described techniques may detect user obstruction of at least one of a transmission beam or a receive beam of the selected serving beam pair, and may present an indication based on detecting the obstruction. In some examples, the indication of the serving beam pair may indicate that the user is obstructing either or both of the transmission beam or the receive beam. In other examples, the indication may show where the selected serving beam pair is located on a periphery of the wireless device even when neither beam is obstructed. or when one or both are obstructed.

A method of wireless communication is described. The method may include performing transmission or receive beam measurements at two or more wireless antennas of a wireless device, selecting a serving beam pair based on the transmission or receive beam measurements, and presenting an indication at the wireless device corresponding to the selected serving beam pair.

An apparatus for wireless communication is described. The apparatus may include a processor, memory in electronic communication with the processor, and instructions stored in the memory. The instructions may be executable by the processor to cause the apparatus to perform transmission or receive beam measurements at two or more wireless antennas of a wireless device, select a serving beam pair based on the transmission or receive beam measurements, and present an indication at the wireless device corresponding to the selected serving beam pair.

Another apparatus for wireless communication is described. The apparatus may include means for performing transmission or receive beam measurements at two or more wireless antennas of a wireless device, selecting a serving beam pair based on the transmission or receive beam measurements, and presenting an indication at the wireless device corresponding to the selected serving beam pair.

A non-transitory computer-readable medium storing code for wireless communication is described. The code may include instructions executable by a processor to perform transmission or receive beam measurements at two or more wireless antennas of a wireless device, select a serving beam pair based on the transmission or receive beam measurements, and present an indication at the wireless device corresponding to the selected serving beam pair.

Some examples of the method, apparatuses, and non-transitory computer-readable medium described herein may further include operations, features, means, or instructions for detecting user obstruction of at least one of a transmission beam or a receive beam of the selected serving beam pair, where the indication indicates the user obstruction of the selected serving beam pair.

In some examples of the method, apparatuses, and non-transitory computer-readable medium described herein, selecting the serving beam pair further may include operations, features, means, or instructions for selecting a transmission beam and a receive beam based on performing the transmission beam measurements and the receive beam measurements.

In some examples of the method, apparatuses, and non-transitory computer-readable medium described herein, performing the transmission or receive beam measurements further may include operations, features, means, or instructions for determining that a transmission power restriction applies to the selected serving beam pair based on the transmission beam measurements.

Some examples of the method, apparatuses, and non-transitory computer-readable medium described herein may further include operations, features, means, or instructions for determining a threshold exposure level for a power density exposure, where determining that the transmission power restriction applies to the selected serving beam pair further includes determining that at least one of the transmission beam measurements exceeds the threshold exposure level.

In some examples of the method, apparatuses, and non-transitory computer-readable medium described herein, the threshold exposure level may include operations, features, means, or instructions for storing the MPE at the wireless device.

Some examples of the method, apparatuses, and non-transitory computer-readable medium described herein may further include operations, features, means, or instructions for determining that the transmission power restriction no longer applies to the selected serving beam pair, and transmitting a wireless signal using the selected serving beam pair.

Some examples of the method, apparatuses, and non-transitory computer-readable medium described herein may further include operations, features, means, or instructions for determining that the transmission power restriction still applies to the selected serving beam pair, and transmitting a wireless signal using a different serving beam pair unrestricted by the transmission power restriction.

In some examples of the method, apparatuses, and non-transitory computer-readable medium described herein, performing transmission or receive beam measurements further may include operations, features, means, or instructions for identifying a selected receive beam corresponding to a signal reception rate based on the receive beam measurements, where the selected serving beam pair includes the selected receive beam, and where presenting the indication further includes presenting an indication at the wireless device that corresponds to the selected receive beam.

In some examples of the method, apparatuses, and non-transitory computer-readable medium described herein, performing the transmission or receive beam measurements further may include operations, features, means, or instructions for determining, based on the transmission beam measurements, that a transmission power restriction applies to the selected serving beam pair based on detecting physical contact near a first antenna associated with the selected serving beam pair.

In some examples of the method, apparatuses, and non-transitory computer-readable medium described herein, the indication may be an image output on a visual display of the wireless device, and where the image indicates that a user may be in physical contact with the wireless device near the selected serving beam pair.

In some examples of the method, apparatuses, and non-transitory computer-readable medium described herein, the indication may be an image output on a visual display of the wireless device, and where the image includes an indication of a way to hold the wireless device that does not block the selected serving beam pair, an indicator related to radio frequency conditions, a signal strength indicator, a best beam path indicator, a suggested orientation of the wireless device, or combinations thereof.

In some examples of the method, apparatuses, and non-transitory computer-readable medium described herein, performing the transmission or receive beam measurements further may include operations, features, means, or instructions for periodically performing the transmission or receive beam measurements.

Some examples of the method, apparatuses, and non-transitory computer-readable medium described herein may further include operations, features, means, or instructions for selecting a second serving beam pair associated with a second highest throughput value based on the transmission or receive beam measurements, and transmitting a wireless signal using the second serving beam pair.

In some examples of the method, apparatuses, and non-transitory computer-readable medium described herein, performing the transmission or receive beam measurements further may include operations, features, means, or instructions for measuring transmission throughput for one or more phasors of each of the two or more antennas of the wireless device.

Some examples of the method, apparatuses, and non-transitory computer-readable medium described herein may further include operations, features, means, or instructions for determining a data throughput level for transmissions at the wireless device, and comparing the data throughput level to a threshold data throughput level, where providing the indication at the wireless device may be further based on the data throughput level being less than the threshold data throughput level.

Some examples of the method, apparatuses, and non-transitory computer-readable medium described herein may further include operations, features, means, or instructions for determining that a battery level does not satisfy a battery threshold level, where providing the indication at the wireless device may be further based on the battery level not satisfying the battery threshold level.

Some examples of the method, apparatuses, and non-transitory computer-readable medium described herein may further include operations, features, means, or instructions for determining a temperature of the wireless device, where providing the indication at the wireless device may be further based on the temperature of the wireless device.

Some examples of the method, apparatuses, and non-transitory computer-readable medium described herein may further include operations, features, means, or instructions for detecting a change in an orientation of the wireless device, and performing the transmission or receive beam measurements in response to detecting the change in the orientation of the wireless device.

In some examples of the method, apparatuses, and non-transitory computer-readable medium described herein, the selected serving beam pair may be associated with a highest throughput value associated with the transmission or receive beam measurements.

DETAILED DESCRIPTION

Figure 1:
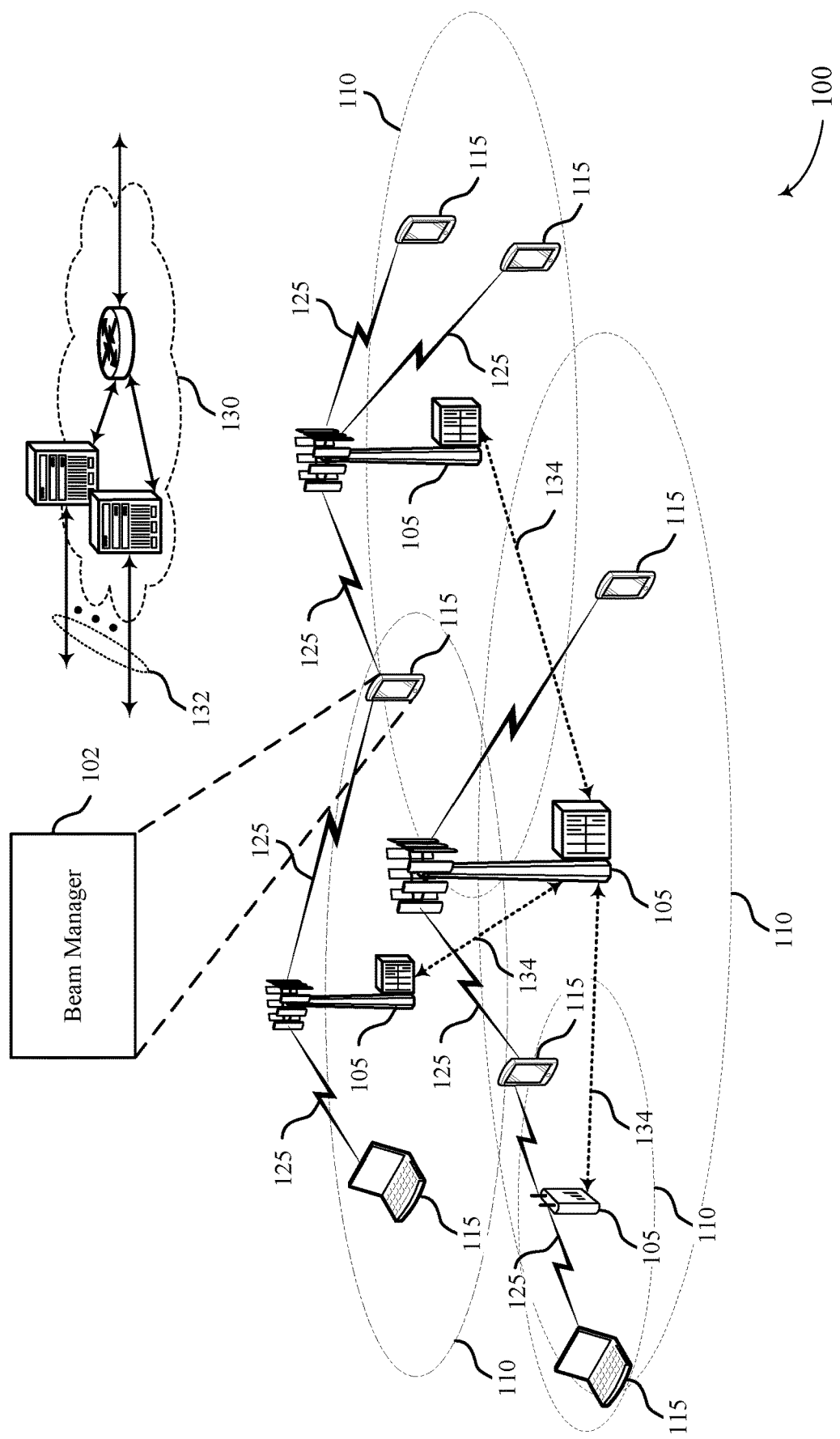
FIG. 1 illustrates an example of a system for wireless communications that supports beam selection in handheld wireless communications devices in accordance with aspects of the present disclosure.

Wireless communication devices may have several different antennas for transmitting and receiving information, including antennas using different radio access technologies (RATs). A wireless device, such as a user equipment (UE), may have antennas positioned at various locations around a housing of the UE. A UE may select a serving beam pair that includes a transmission beam and a receive beam that use certain of these antennas. When a user holds a conventional UE, the user may inadvertently obstruct the selected serving beam pair because the conventional UE does not inform the user which beams have been selected nor informs the user of the locations of the antennas around the housing corresponding to the selected beams. Obstructing the selected serving beam pair may result in lower received signal strengths, lower throughputs, or the user's tissue being exposed to transmissions.

Techniques described herein may include performing transmission or receive beam measurements for the antennas of a wireless device for selecting a serving beam pair in terms of factors such as transmission throughput and received signal strength. The wireless device may present an indication that informs a user about the currently selected serving beam pair and the locations of antennas on the housing of the wireless device used to generate the beams of the serving beam pair. For instance, the indication may indicate a location of one or more antennas along the housing of the UE used to generate the serving beam pair, how to hold the wireless device to not obstruct the serving beam pair, an indication that at least one beam of the serving beam pair is being obstructed, and the like. The techniques described herein enable a UE to notify a user of the location of the antenna elements along the housing of the UE that corresponds to the selected receive/transmission beams to prevent the user from unintentionally obstructing the best beams.

Additionally, some regulators of wireless communications put an upper threshold on the transmission power that an antenna, or phasor, can use when human tissue is proximate to the antenna. For example, a maximum permissible exposure (MPE) may be defined in terms of a maximum power density over a given frequency range. In some example, human tissue may be considered proximate to an antenna when a user holds a wireless communications device at a location over the antenna.

Techniques described herein enable a wireless device to determine when a user is at risk of being exposed to the MPE and mitigating this exposure. The wireless device may determine that a transmission power restriction applies to the selected serving beam pair. The transmission power restriction may prevent the wireless device from transmitting using a power higher than the transmission power restriction because a user is contacting the housing proximate to or over the selected serving beam pair. Methods of mitigating the exposure may include choosing to transmit on a phasor different than the one to which the user is exposed, providing an indication to the user to contact the wireless device in a different way so the user does not touch the wireless device over the phasor, providing an indication of a selected transmission and/or receive beam, providing an indication of a different orientation in which to hold the wireless device, and the like. These methods can be used to help the user to not block a beam in a serving beam pair, enables the wireless device to stay within the MPE limits, and does not degrade receive performance by keeping the receive beam obstruction free.

Techniques described herein also enable a wireless device to determine when a user blocking a best receive beam. The wireless device may provide indications to the user to encourage the user to reposition the wireless device or the way the user is holding the wireless device.

By implementing these techniques, a user may be exposed to less power density, a wireless device may extend its battery life, and an improved user experience through better throughputs and received signal strength may be achieved. For example, the techniques described herein enable a UE to display a software pop-up that indicates to the user to unblock the beam or informs the user of the a location of an antenna used to generate a beam in the serving beam pair. Furthermore, by implementing these techniques, a wireless device may reduce battery drain because it permits the use of a single phasor to generate both a transmission beam and a receive beam of a serving beam pair due to the user not obstructing one or more antennas of that phasor used to generate the transmission beam and the receive beam, instead of operating multiple phasors due to one of a receive beam or a transmission beam of the serving beam pair being obstructed, which may increase battery drain.

Aspects of the disclosure are initially described in the context of a wireless communications system. Aspects of the disclosure are illustrated by beam selection and notifications to a user related to beam selections for handheld wireless devices. Aspects of the disclosure are further illustrated by and described with reference to apparatus diagrams, system diagrams, and flowcharts that relate to beam selection in handheld wireless communications devices.

FIG. 1 illustrates an example of a wireless communications system 100 that supports beam selection in handheld wireless communications devices in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap. Overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based at least in part on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based at least in part on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmission beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may have antennas positioned at various locations around its housing and may make measurements to determine which beams are the best to use for transmitting and receiving. Conventional techniques do not inform a user of the best beams, nor do they indicate to a user when the best beams are being obstructed. Instead, conventional techniques switch to a worse performing transmit or receive beam when an obstruction occurs, maintain different transmit or receive beams from different phasors, or change properties of transmissions to reduce power density exposure level for the user. Properties changed for the transmission beam may include using a different modulation and coding scheme or reducing transmission power, for example.

Techniques described herein enable a UE 115 to detect an obstruction, such as a human appendage, in a transmit or receive path of the UE 115 and provide mechanisms to change or compensate for the obstruction. The UE 115 may detect the human touch in the transmit path by making periodic transmission or receive beam measurements. Prior to or after human touch is detected or suspected, the UE 115 may provide an indication related to the obstruction or to reduce the likelihood of obstruction. The indication may take many forms, including audio, visual, or haptic feedback.

A user may often be in physical contact with a wireless device and may be exposed to transmissions from the wireless device. Also, the user may obstruct reception at the wireless device. The wireless device may switch to another transmit or receive beam pair in order to reduce the user's exposure to the transmit power or to improve reception. Using different beam pairs may degrade performance at the wireless device and may also drain its battery. A user may unintentionally or unknowingly obstruct the best beam paths for the wireless device.

One or more of the UEs 115 may include a beam manager 102, which may perform transmission or receive beam measurements at two or more wireless antennas of the UE 115, select a serving beam pair based at least in part on the transmission or receive beam measurements, and present an indication at the UE 115 corresponding to the selected serving beam pair.

Figure 2:
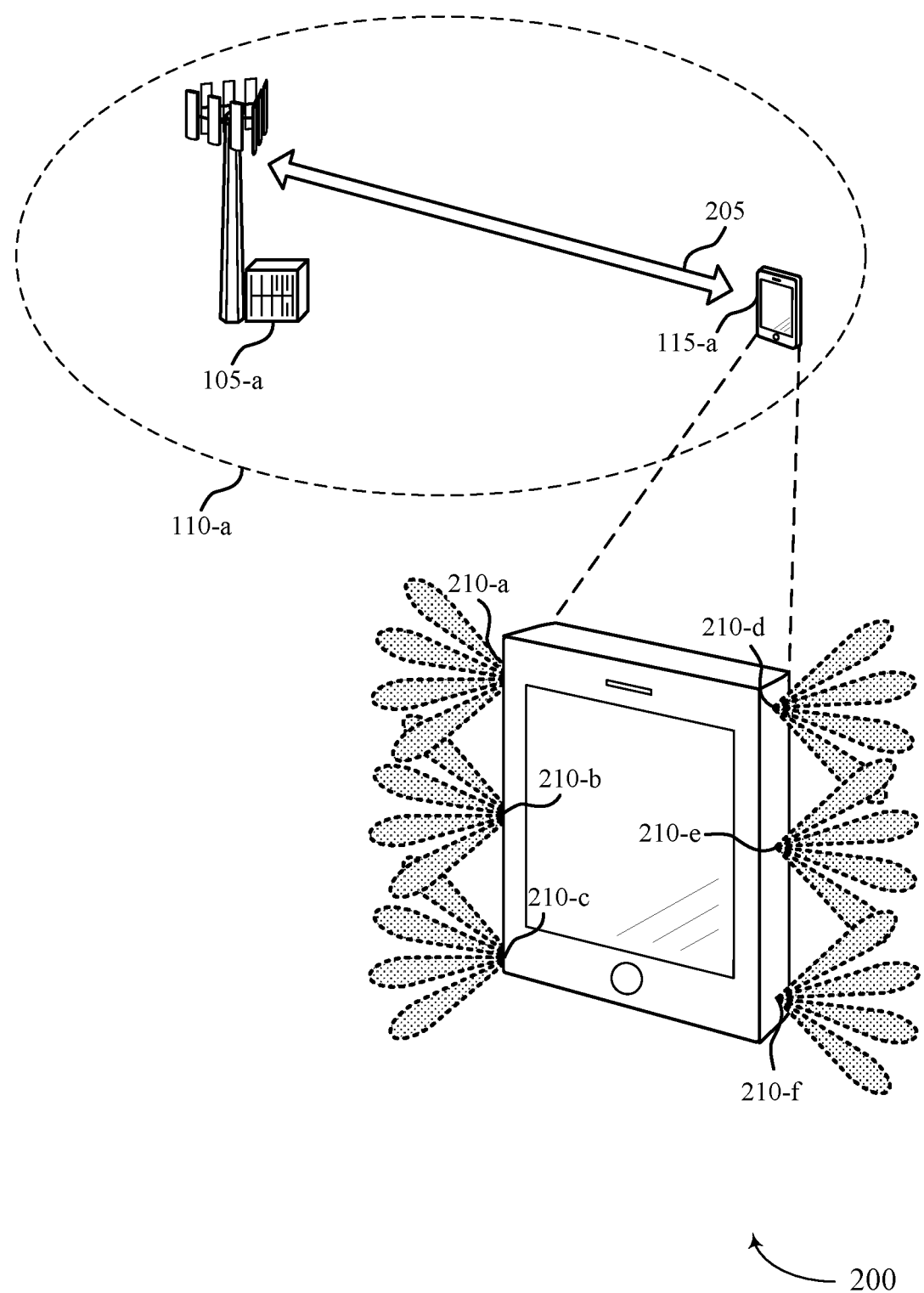
FIG. 2 illustrates an example of a system for wireless communications which shows phasors in handheld wireless communications devices in accordance with aspects of the present disclosure.

FIG. 2 illustrates an example of a system for wireless communications 200 which shows example phasors 210 in a handheld wireless communications device in accordance with aspects of the present disclosure. In some examples, the system 200 may implement aspects of wireless communication system 100. The system 200 may include a base station 105-$a$ and a UE 115-$a$. The base station 105-$a$ may be an example of aspects of a base station 105 as described herein. The UE 115-$a$ may be an example of aspects of a UE 115 as described herein. The UE 115-$a$ may communicate with the base station 105-$a$ over communication link 205.

The UE 115-$a$ may include several phasor components 210-$a$ through 210-$f$ (collectively referred to as phasor components 210) which can be used to generate one or more transmission or receive beams. In the example of FIG. 2, six phasor components 210 are shown, each capable of generating a defined number or transmission and/or receive beams (e.g., generate 128 beams per phasor component 210). In other examples, other numbers of phasor components 210 and beams are used, such as four phasor components 210. The phasor components 210 may be placed at any location along a housing of the UE, including, for example, on a top side, a bottom side, a left side, a right side, a back side, a front side, or the like. Based on the environment and the orientation of the UE 115-$a$, some of the phasor components 210 may have better transmission and reception than other phasors. The UE 115-$a$ may periodically measure received signals and transmit signals in order to determine which phasor components 210 are associated with the best transmit and receive signals. A pair of a transmission beam and a receive beam may be referred to herein as a serving beam pair.

For example, the UE 115-$a$ may measure a signal at each phasor component 210 and selects which phasor component has the best receive beam. For downlink transmissions, a base station 105 may transmit a reference signal that the UE 115-$a$ measures using each of its receive beams from each of the phasor components 210. The UE 115-$a$ determines which receive beam at which phasor component 210 has the highest measured value, and then selects that beam as the best receive beam. Values that may be measured include Reference Signal Received Power (RSRP), Received Signal Strength Indictor (RSSI), Reference Signal Received Quality (RSRQ), Signal to Noise Ratio (SNR), and Signal Interference to Noise Ratio (SINR), for example.

The UE 115-$a$ may also transmit a signal from each phasor component 210 on each transmission beam at different times. For uplink transmissions, the UE 115-$a$ may transmit a reference signal via each of its beams at each phasor component 210. A receiving device, such as base station 105-$a$, may receive the reference signals and inform the UE 115-$a$ which transmission had the best reception. The base station 105-$a$ may also measure values such as the RSRP, RSSI, RSRQ, SNR, SINR, or other signal quality metric. Using this feedback, the UE 115-$a$ may select the phasor component 210 that corresponded to the best transmission beam. For example, if the base station 105-$a$ indicates that a beam transmitted in a slot x was the best beam, the UE 115-$a$ determines which transmission beam and which phasor component 210 corresponded to the slot x. A pair of a transmission beam and a receive beam may be referred to herein as a serving beam pair.

In some examples, the selected serving beam pair may be generated by the same phasor component (e.g., phasor component 210-$b$). In other examples, the selected serving beam pair may be generated by different phasor components 210. For example, the best transmission beam may be at phasor component 210-$b$ while the best receive beam may be at a different phasor component 210, such as phasor component 210-$f$. In some examples, UE 115-$a$ may attempt to identify a same phasor component 210 where a measurement of at least one transmit beam satisfies a first threshold (e.g., a RSRP threshold) and a measurement of at least one receive beam satisfies a second threshold (e.g., a RSRP threshold), and may select a transmit beam and a receive beam on that same phasor component 210 to only operate that single phasor component 210 for improved battery performance of UE 115-$a$.

In some examples, the UE 115-$a$ may support mmW communications. In mmW communications, the radio frequency environment can be very dynamic because propagation of mm waves can be subject to large path loss. At very high power densities, mmW or other radio waves may be hazardous to human tissue, such as to skin and eyes. Regulatory bodies may create guidelines to have a maximum permissible exposure to these mmW. For example, an MPE may be set for particular frequencies. For example, a maximum power density threshold can be set for frequencies between 6 and 100 GHz. In other examples, other thresholds for other frequency spectrums may be used. In some examples, if a user at risk for being exposed to RF higher than the MPE, the UE 115-$a$ may have to take an action to mitigate the exposure, such as transmitting using different transmission beams or using less power in order to not exceed the MPE.

However, the way a user may hold the UE 115-$a$ may block the best transmission beam or the best receive beam. As discussed above, if a sensor detects human tissue in contact with the UE 115-$a$ in the transmission beam of the serving beam pair, the UE 115-$a$ should not use that beam for transmissions if the transmission power would exceed the MPE. The UE 115-$a$ could turn on a different transmission beam but leave the receive beam the same, which may result in lower performance because having two phasors turned on (e.g., one for receive and one for transmit) consumes more power. In another example, when a transmission beam has to be blocked or otherwise obstructed, both the transmission and receive beams may be switched for the sake of simplicity, which may result in compromising performance on the receive side. Transmitting at the transmission beam at a reduced power level so as to not exceed the MPE would also result in poorer performance and data throughput. Techniques described herein provide for the UE 115-to present an indication to a user of a location of one or more antennas of a phasor component used to generate the serving beam pair and/or to request the user to hold the UE 115-a in a different manner to avoid obstructing the serving beam pair.

Figure 3:
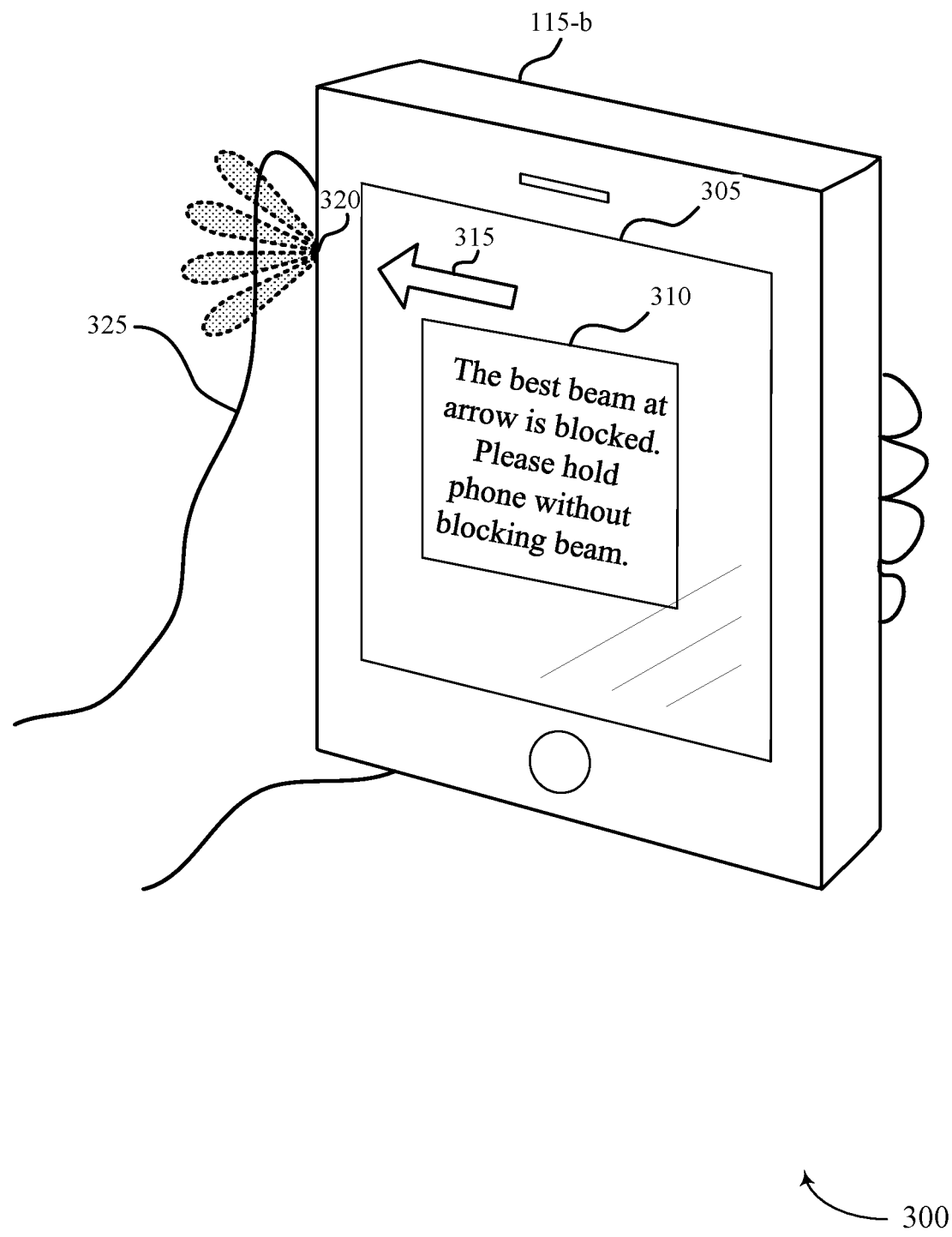
FIGS. 3 through 5 illustrate example of a wireless device that supports beam selection in handheld wireless communications devices in accordance with aspects of the present disclosure.

FIG. 3 illustrates an example of a wireless communications system 300 that supports beam selection in handheld wireless communications devices in accordance with aspects of the present disclosure. In some examples, the wireless communications system 300 may implement aspects of the system 100 as shown in FIG. 1.

The wireless communications system 300 includes a user 325 holding a wireless device, UE 115-b. The UE 115-b may be or implement aspects of a UE 115 as shown in FIGS. 1 and 2. The UE 115-b may include a graphical user interface (GUI) 305. The GUI 305 may be any type of visual display, such as, for example, a graphic display screen, a touchscreen or a presence sense screen. For simplicity, one phasor 320 of the UE 115-b is illustrated while the UE 115-b may include additional phasors.

As shown in the example of FIG. 3, the user 325 is holding the UE 115-b with a finger over or near the phasor 320. In some examples, the phasor 320 may be used to generate the transmission and/or receive beam of the serving beam pair. If this is the case, the UE 115-b may determine that the best beam is blocked. Due to restrictions in user exposure to transmission power, such as the MPE, the UE 115-b may not be able to transmit on the phasor 320 while the user 325 is holding the UE 115-b over the phasor 320. Transmitting using the phasor 320 above a certain transmit power level may expose the user 325 to transmit powers above the MPE.

In order to maintain good performance while not exposing the user 325 to transmissions above the MPE, the UE 115-b may provide an indication 310 to the user 325. The indication 310 may notify the user 325 that the best beam (e.g., generated by phasor 320) is being blocked or otherwise obstructed. The example of FIG. 3 provides the indication 310 which reads "The best beam at arrow is blocked. Please hold phone without blocking beam." In other examples, other messages may be presented in the indication 310. The GUI 305 may also provide an indicator 315 which identifies which phasor 320 is being blocked or where the UE 115-b is being contacted. In this example, the indicator 315 is an arrow pointing to where the UE 115-b is being touched that corresponds to the blocked phasor 320. In other examples, the indication 310 may illustrate how the user 325 could hold the UE 115-b without obstructing the phasor 320. Other examples provide other types of information that convey to the user 325 that the best beam may be being blocked.

In some examples, the indication 310 and 315 may pop-up on the GUI 305 when the user 325 blocks the best transmission beam. The indications 310 and 315 may be software pop-up notifications. In some examples, the indication 310 and 315 may be a single notification or may be more than two notifications. In some examples, the indication 315 may be a dot or other image that is displayed near where the obstruction is occurring. For example, the notification 315 may be a red dot that illustrates the best beam is being obstructed. Other examples may show the notification 315 where the best beam is, regardless of whether it is being obstructed during the display or not. Other methods of indicating this information may also be used, such as verbal notifications, beeps, haptic feedback, or the like.

These indication 310 and 315 may be displayed when the battery power of the UE 115-b is less than a threshold level. For example, if the battery power is low, the UE 115-b may want to conserve energy by not transmitting at a high power. If one or more phasors 320 of the UE 115-b are being blocked, the UE 115-b may have to transmit at a higher power or transmit more than once in order to have successful transmissions. Similarly, if the user 325 is blocking a receive beam, the obstruction may result in poorer performance and greater battery power consumption. In other examples, the indication 310 and 315 may be displayed when data throughput is below a data throughput threshold level.

By providing the one or more indications 310 and 315, the UE 115-b gives the user 325 an opportunity to unblock it, such as by changing the way the UE 115-b is being held. The UE 115-b may maintain the indications 310 or 315 until the best beam is no longer being blocked, for example. If the UE 115-b detects that the best beam is no longer being blocked, the UE 115-b may withdraw the indications 310 or 315. In other examples, the indications 310 and 315 may be displayed for a set duration.

Figure 4:
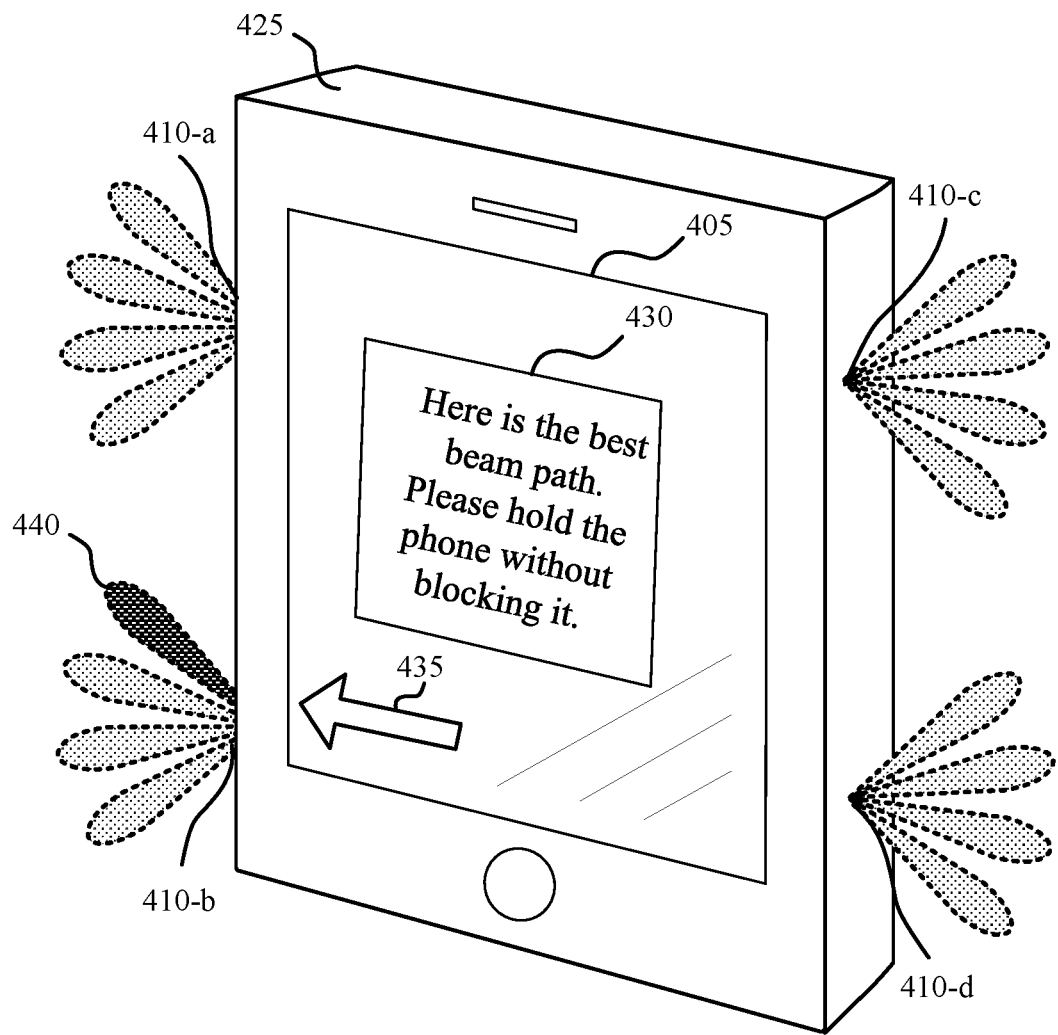

FIG. 4 illustrates an example of a wireless device 400 that supports beam selection in handheld wireless communications devices in accordance with aspects of the present disclosure. In some examples, wireless device 400 may implement aspects of a UE 115 as shown in FIGS. 1-3.

The wireless device 400 may include four phasor components 410-a through 410-d (collectively referred to herein as phasor components 410) located at different places along a periphery of a housing 425. In this example, the wireless device 400 has determined that the beam pair represented by beam 440 is the best beam pair based on measurements performed as discussed herein.

The wireless device 400 may include a graphical user interface (GUI) 405. The wireless device 400 may display an indication 430 at the GUI 405. In this example, the indication 430 states "Here is the best beam path. Please hold the phone without blocking it." In other examples, other messages may be displayed. The GUI 405 also provides an indication 435, which points to a location on the housing 425 that corresponds to the best beam pair 440. In other words, the indication 430 provides a user with information showing where the best beam path is located on the wireless device 400.

In some examples, just one or both of the indications 430 and 435 may be displayed. In some examples, the indication 435 may be displayed throughout a communication, such as a phone call or a data session, to indicate to a user where the best beam during the transaction. The indication 435 may be updated to reflect any change in the best beam due to changes in environment, beam path, orientation of the wireless device 400, location of the wireless device 400, and the like. The indications 430 and 435 may have any of the variations (e.g., color coding, time of display, type of message, etc.) described herein.

In other examples, the indication 435 may be used as a signal strength indicator. For example, the signal strength may be color coded such that a user can identify the quality of the signal being received. For example, a green color may indicate a stronger signal strength while a red color may indicate a poorer signal strength. In other examples, other images and colors may be used. For example, in poor RF conditions, a different color code may be used.

The indication 435 may be updated as the signal strength changes. For example, if the user rotates the wireless device 400, then the signal strength at the best beam 440 may improve or degrade. In some examples, which phasor component 410 has the best beam may change based on the rotation of wireless device 400 or other environmental changes. The indication 435 may reflect this change in signal strength. In some examples, the indication 435 may move to indicate the best beam when the best beam changes.

Figure 5:
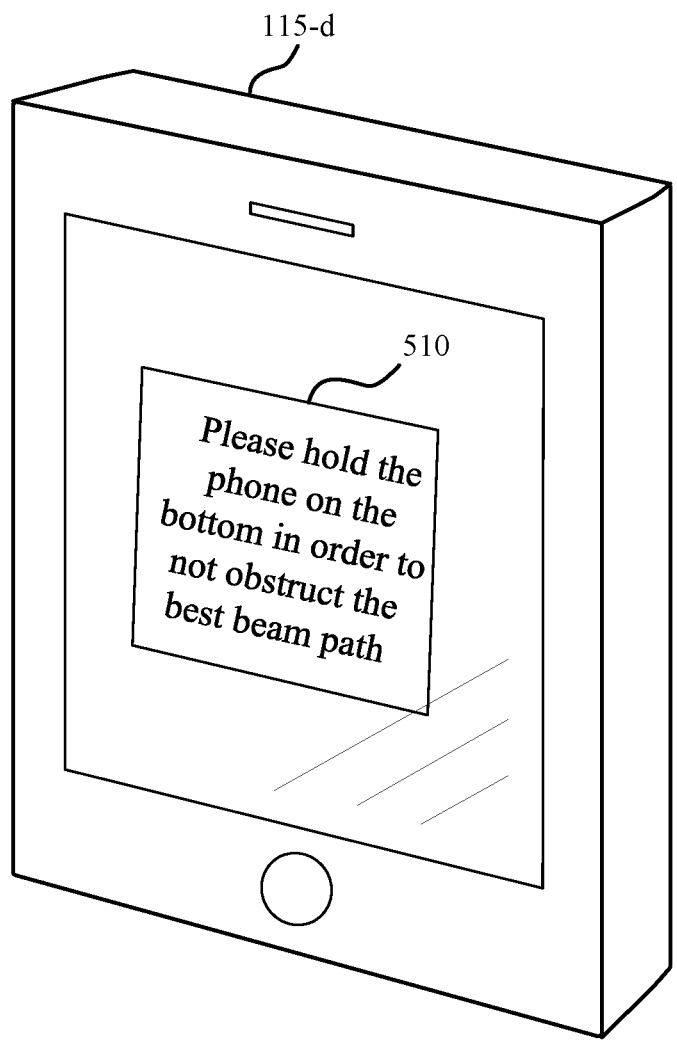

FIG. 5 illustrates an example of a wireless device 500 that supports beam selection in handheld wireless communications devices in accordance with aspects of the present disclosure. In some examples, wireless device 500 may implement aspects of a UE 115 as shown in FIGS. 1-4.

The wireless device 500 may include a graphical user interface (GUI) 505. The wireless device 500 may display an indication 510 at the GUI 505. In this example, the indication 510 may notify the user of how to hold the wireless device 500 with minimal obstruction of the best beam. The indication 510 may read, as shown in FIG. 5, something like "Please hold the phone on the bottom in order to not obstruct the best beam path." The indication 510 may differ in other examples. For example, the indication 510 may be an image that shows how the wireless device 500 should be held without obstructing the best beam.

In some examples, the wireless device 500 may determine where the best beam is, and then look up one or more options for holding the wireless device 500 without obstructing the best beam. For example, the wireless device 500 may store a database of best beams linked to ways to hold the wireless device 500 without obstructing the identified best beam. The database may be populated with different hand positions for holding the wireless device 500. Once the wireless device 500 determines the best beam, it may query this database to determine which options are available for holding it without obstructing the best beam.

In some examples, the indication 510 may provide a notification of how the wireless device 500 may be oriented to provide the best signal strength. For example, when a user is holding the wireless device 500 in one direction, the wireless device may receive a moderate signal strength, while if the wireless device 500 was held in a different direction, it would receive higher signal strength. The indication 510 may display information that informs a user how to position the wireless device 500 for improved signal strength. As described above, the indication 510 can include words or images, and may show different color coding to indicate signal strength. In one example, the wireless device 500 can determine different signal quality thresholds (e.g., poor, moderate, good) and categorize the received signal (e.g., RSRP) into one of these bands. For example, the poor category may correspond to RSRPs below a first threshold, the moderate category may correspond to RSRPs at or above the first threshold but below a second threshold larger than the first threshold, and the good category may correspond to RSRPs at or above the second threshold. These categories may be color coded or otherwise indicated to the user. In other examples, other methods for showing signal strength can be used, including intensity, size, a type of image, a number of bars, a number of dots, a network symbol, or the like. Some examples may use quality of RF signal strength classifications used in other systems or functionalities.

Figure 6:
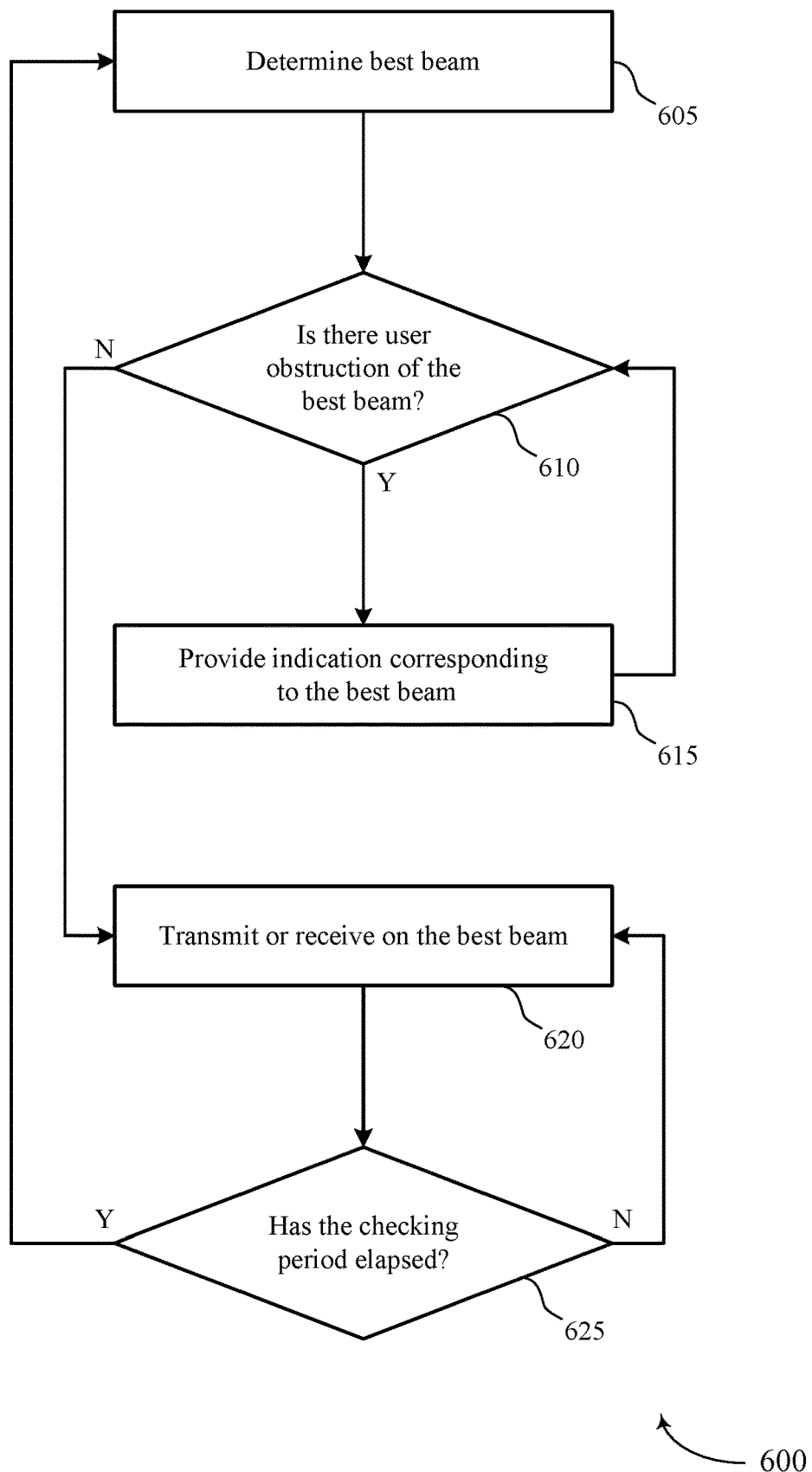
FIG. 6 illustrates an example of a flowchart that supports beam selection in handheld wireless communications devices in accordance with aspects of the present disclosure.

FIG. 6 illustrates a flowchart illustrating an example method 600 that supports beam selection in handheld wireless communications devices in accordance with aspects of the present disclosure. In some examples, the method 600 may implement aspects of wireless communication system 100.

At 605, the method 600 includes determining a best beam for transmitting or receiving at a wireless device. The method 600 may include performing transmission or receive beam measurements at two or more wireless antennas of the wireless device. In some examples, measurements are performed on all antennas and all phasors. In other examples, measurements are performed on only a subset of antennas or phasors. The method 600 may include periodically performing the transmission or receive beam measurements. In other examples, the method 600 may further include measuring transmission throughput for one or more phasors of each of two or more antennas of the wireless device.

Based at least in part on the measurements, the method 600 may determine which is the best beam for transmissions or reception. The best beam may be a beam having a highest data throughput for transmissions or a highest signal strength for reception. The measurements may be, for example, reference signal measurements. Values that may be measured include RSRP, RSSI, RSRQ, SNR, and SINR, for example. In other examples, other values or qualities of the signals may be measured. In one example, the UE selects the receive beam having the highest measured RSRP as the best receive beam.

The method 600 may further include making measurements periodically, for example, every 20 ms. In other examples, other periodicities may be used, for example, every 5 or 100 ms. The method 600 may compare these values at each of the phasors measured and select the highest values for the best serving pair.

In some examples, the frequency of the receive or transmission beam measurements may be adjusted based on factors including, but not limited to, the frequency of the communications, a battery power of the wireless device, an MPE level, a user set frequency, a type of communication being performed (e.g., a voice call, video call, data, etc.), current signal conditions, a modulation and coding scheme, and the like.

At 610, the method 600 determines whether there is user obstruction of the best beam. Based on the measurements being below a threshold level, the wireless device can determine that the best beam is being obstructed. If, for example, the wireless device determines it is receiving an unsatisfactorily high number of decoding errors using the best receive beam (e.g., data throughput on the best receive beam falls below the threshold during a particular time interval), the reduction in data throughput can be used to determine that the best receive beam is being blocked. In other examples of the method 600, a sensor, such as a touch sensor, can be used to determine that a user is at least partially obstructing or blocking the best beam.

The method 600 may check if a maximum power output for a transmission exceeds an MPE where a user is contacting the wireless device. If the maximum power output for transmitting exceeds the MPE, the method 600 may determine that the user is obstructing the transmission beam, and the obstruction (e.g., the user's hand) may have to be repositioned. Conventional solutions switch to sub-optimal beams due to the MPE exposure because conventional solutions fail to inform the user that they are blocking the best beam. Techniques described herein instead inform the user when the best transmit beam is being block and may result in the user moving the obstruction. No longer obstructing the best beam may result in provide improved data throughout performance.

If the method 600 detects that the best beam is being blocked, the method 600 provides an indication corresponding to the best beam at the wireless device at block 615. For example, the wireless device may output an indication, such as an image showing the best beam or a message to reposition the phone. Other indications may be provided as described herein. The method 600 may return to 610 to determine if the best beam is no longer being blocked. The method 600 may continue to provide an indication of the obstruction until the best beam is no longer blocked. In some examples, this may mean that the best beam may be reassessed and changed before the obstruction is removed.

At 620, the method 600 communicates using the best beam once it is not obstructed. For example, the wireless device may transmit or receive using the best beam. In some examples, the wireless device will not transmit while the best beam is obstructed if the transmission would expose the user to more power density than the MPE level. However, the wireless device may continue to receive on the best beam even if it is obstructed.

At 625, the method 600 determines if it is time to recheck the best beam by determining whether a checking period has elapsed. In some examples, the checking period is every 100 ms, which may be different in other examples. If not, the wireless continues to transmit on the best beam. If so, the method 600 returns to 605 to again determine the best beam. A determination on whether the best beam has changed may be based on the measured RSRP and/or input from an MPE sensor. In this example, the wireless device may monitor whether the RSRP measurement for the best receive beam changes more than a threshold amount from a prior RSRP measurement during the previous time interval. If it has, the wireless device may select an updated serving beam pair or best pair. If not, the selected serving beam pair remains the same until the next time the method 600 determines whether to switch beams.

In some examples, the method 600 reassesses the best beam whenever a change in orientation is noted at the wireless device. The change in orientation may be based on accelerometers gyroscopes onboard the wireless device or based on external positioning information, for example.

Figure 7:
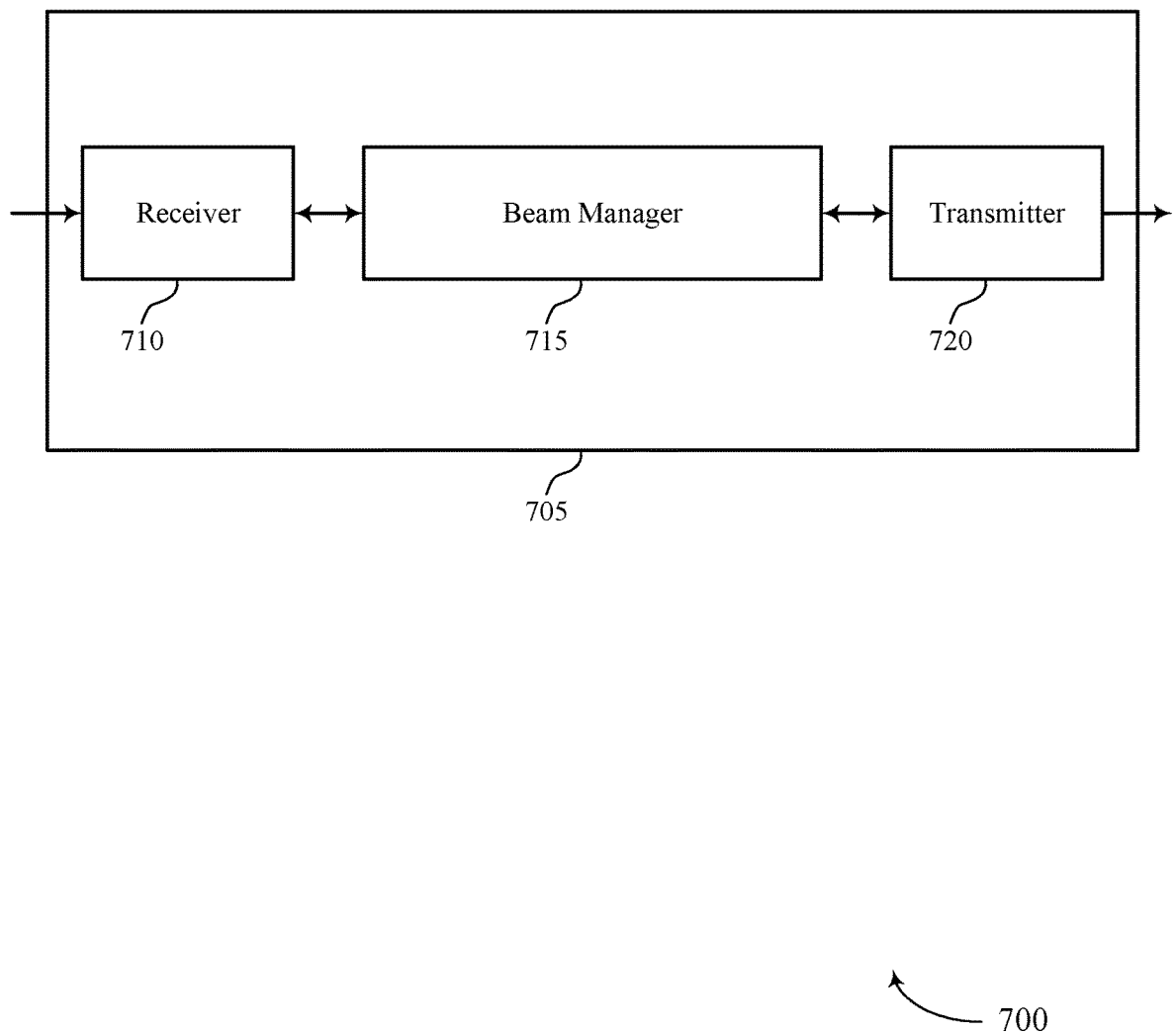
FIGS. 7 and 8 show block diagrams of devices that support beam selection in handheld wireless communications devices in accordance with aspects of the present disclosure.

FIG. 7 shows a block diagram 700 of a device 705 that supports beam selection in handheld wireless communications devices in accordance with aspects of the present disclosure. The device 705 may be an example of aspects of a UE 115 as described herein. The device 705 may include a receiver 710, a beam manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to beam selection in handheld wireless communications devices, etc.). Information may be passed on to other components of the device 705. The receiver 710 may be an example of aspects of the transceiver 1020 described with reference to FIG. 10. Periodically, the signals received by receiver 710 may be measured. The receiver 710 may utilize a single antenna or a set of antennas.

The beam manager 715 may perform transmission or receive beam measurements at two or more wireless antennas of the device 705, select a serving beam pair based at least in part on the transmission or receive beam measurements, and present an indication at the device 705 corresponding to the selected serving beam pair. The beam manager 715 may be an example of aspects of the beam manager 102 and 1010 described herein.

The beam manager 715, or its sub-components, may be implemented in hardware, code (e.g., software or firmware) executed by a processor, or any combination thereof. If implemented in code executed by a processor, the functions of the beam manager 715, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The beam manager 715, or its sub-components, may be physically located at various positions, including being distributed such that portions of functions are implemented at different physical locations by one or more physical components. In some examples, the beam manager 715, or its sub-components, may be a separate and distinct component in accordance with various aspects of the present disclosure. In some examples, the beam manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. Periodically, the signals transmitted by receiver 710 may be measured. The transmitter 720 may utilize a single antenna or a set of antennas.

Figure 8:
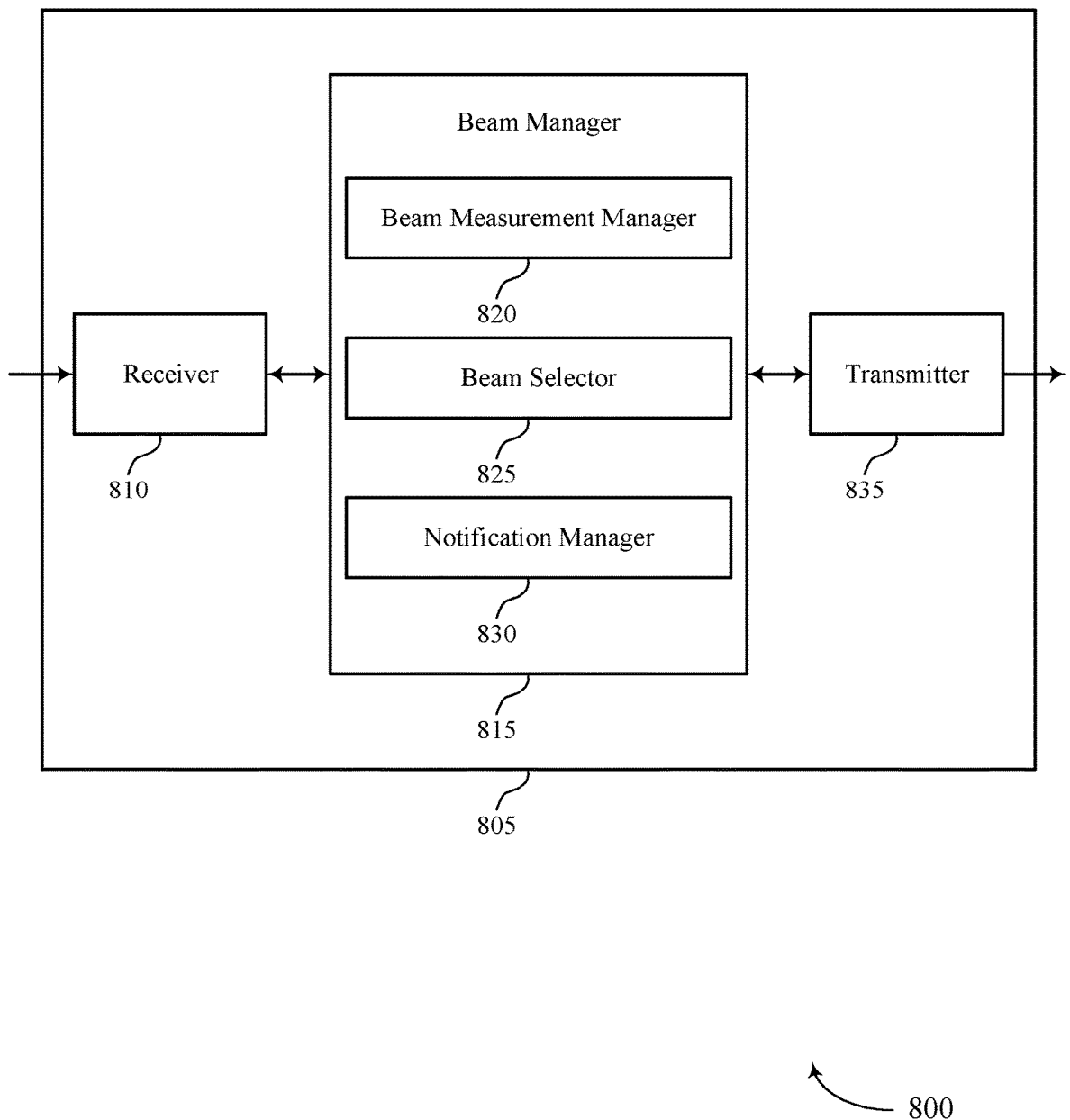

FIG. 8 shows a block diagram 800 of a device 805 that supports beam selection in accordance with aspects of the present disclosure. The device 805 may be an example of aspects of a device 705, or a UE 115 as described herein. The device 805 may include a receiver 810, a beam manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to beam selection in handheld wireless communications devices, etc.). Information may be passed on to other components of the device 805. The receiver 810 may be an example of aspects of the transceiver 1020 described with reference to FIG. 10. The receiver 810 may utilize a single antenna or a set of antennas.

The beam manager 815 may be an example of aspects of the beam manager 102 or 715 as described herein. The beam manager 815 may include a beam measurement manager 820, a beam selector 825, and a notification manager 830. The beam manager 815 may be an example of aspects of the beam manager 1010 described herein.

The beam measurement manager 820 may perform transmission or receive beam measurements at two or more wireless antennas of a wireless device.

The beam selector 825 may select a serving beam pair based at least in part on the transmission or receive beam measurements.

The notification manager 830 may present an indication at the wireless device corresponding to the selected serving beam pair.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
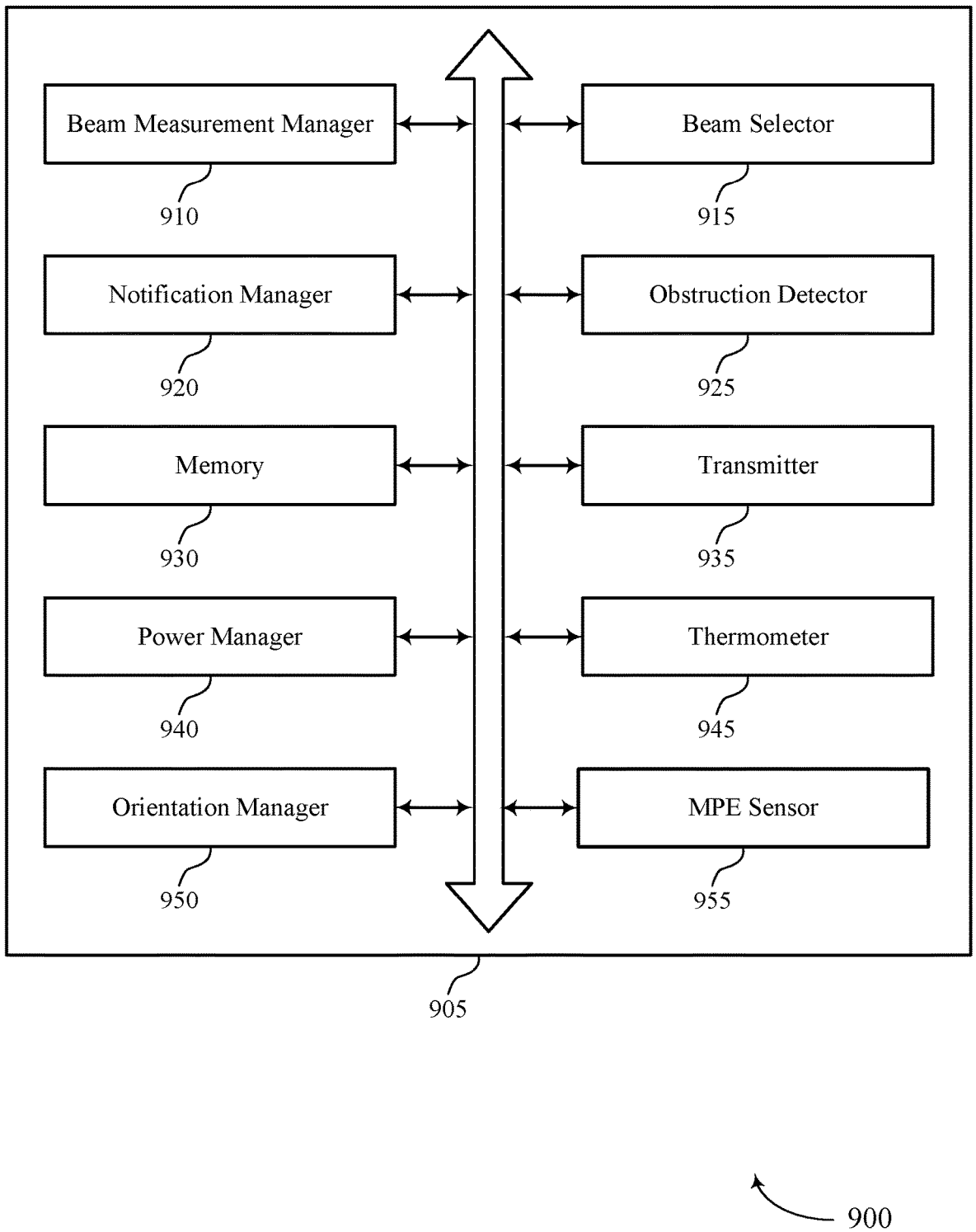
FIG. 9 shows a block diagram of a beam manager that supports beam selection in handheld wireless communications devices in accordance with aspects of the present disclosure.

FIG. 9 shows a block diagram 900 of a beam manager 905 that supports beam selection in handheld wireless communications devices in accordance with aspects of the present disclosure. The beam manager 905 may be an example of aspects of a beam manager 102, a beam manager 715, a beam manager 815, or a beam manager 1010 described herein. The beam manager 905 may include a beam measurement manager 910, a beam selector 915, a notification manager 920, an obstruction detector 925, memory 930, a transmitter 935, a power manager 940, a thermometer 945, an orientation manager 950, and an MPE sensor 955. Each of these modules may communicate, directly or indirectly, with one another (e.g., via one or more buses).

The beam measurement manager 910 may perform transmission or receive beam measurements at two or more wireless antennas of a wireless device. In some examples, the beam measurement manager 910 may periodically perform these measurements. In some examples, the beam measurement manager 910 may measure transmission throughput for one or more phasors of each of the two or more antennas of the wireless device. In some examples, the beam measurement manager 910 may perform the transmission or receive beam measurements in response to detecting the change in the orientation of the wireless device.

In some examples, the beam measurement manager 910 may determine a data throughput level for transmissions at the wireless device.

The beam selector 915 may select a serving beam pair based at least in part on the transmission or receive beam measurements. In some examples, the beam selector 915 may determine that a transmission power restriction applies to the serving beam pair based at least in part on the transmission beam measurements. In some examples, determining a threshold exposure level for a power density exposure applies to the selected serving beam pair further includes determining that at least one of the transmission beam measurements exceeds the threshold exposure level.

In some examples, the beam selector 915 may determine that the transmission power restriction no longer applies to the serving beam pair while in other examples it may determine that the transmission power restriction still applies to the serving beam pair. Determining that the transmission power restriction applies to the selected serving beam pair may be based at least in part on detecting physical contact near a first antenna associated with the selected serving beam pair.

In some examples, the beam selector 915 may select a second serving beam pair associated with a second highest throughput value based at least in part on the transmission or receive beam measurements. For example, the beam selector 915 may select a second serving beam pair other than the best serving beam pair when the beam manager has determined that a user continues to remain in contact with the wireless device despite the issued notifications.

In some examples, the beam selector 915 may compare the data throughput level to a threshold data throughput level, where providing the indication at the wireless device is further based at least in part on the data throughput level being less than the threshold data throughput level.

The notification manager 920 may present an indication at the wireless device corresponding to the selected serving beam pair. The indication may be a visual indication, such as a colored dot showing where the best serving beam pair is on the graphical user interface of the device. In other examples, the indication may be a message that tells a user where the best beam is located or tells the user how to hold the device. In some examples, an image of a preferred way of holding the device may be illustrated.

The obstruction detector 925 may detect user obstruction of at least one of a transmission beam or a receive beam of the selected serving beam pair, where the indication indicates the user obstruction of the selected serving beam pair. The indication may show a location of the obstruction of the selected serving beam pair.

The memory 930 may store one or more MPEs at the wireless device. In some examples, different frequencies or RATs have different MPEs, which may be stored in the memory 930. The memory may also store recent transmission or receive beam measurements.

The transmitter 935 may transmit a wireless signal using the selected serving beam pair. In some examples, the transmitter 935 may transmit a wireless signal using a different serving beam pair unrestricted by the transmission power restriction. For examples, the transmitter 935 may transmit a wireless signal using the second serving beam pair. The second serving beam pair may not be the best serving beam pair.

The power manager 940 may determine that a battery level does not satisfy a battery threshold level, where providing the indication at the wireless device is further based at least in part on the battery level not satisfying the battery threshold level.

The thermometer 945 may determine a temperature of the wireless device, where providing the indication at the wireless device is further based at least in part on the temperature of the wireless device. For example, the wireless device may have to use a higher transmit power (e.g., due to an obstruction), which may result in a higher temperature near the phasor. In some examples, the wireless device may identify a presence of an obstruction based on temperature readings from the thermometer 945. For example, if the measured temperature of the phasor corresponding to best beam or a temperature of the wireless device exceeds a temperature threshold.

The orientation manager 950 may detect a change in an orientation of the wireless device. The orientation of the wireless device may influence the best serving beam, for example.

The MPE sensor 955 may determine that there is an obstruction at the wireless device which may impact a transmission or receive beam. For example, the MPE sensor 955 may be a touch sensor that determines that a user is holding the wireless device at a specific area over a phasor or a best beam. In other examples, the MPE sensor 955 may determine there is an obstruction at the wireless device.

Figure 10:
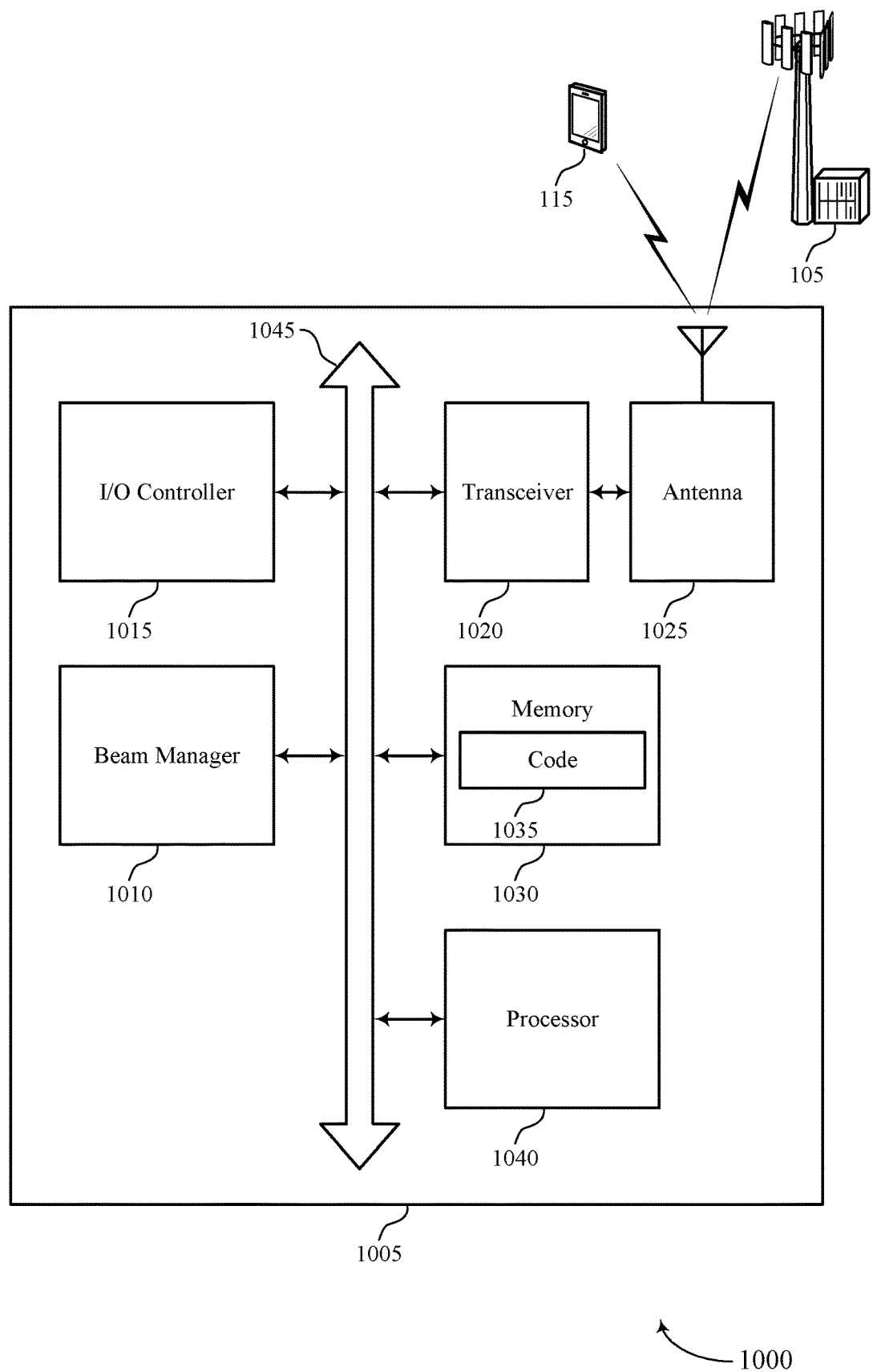
FIG. 10 shows a diagram of a system including a device that supports beam selection in handheld wireless communications devices in accordance with aspects of the present disclosure.

FIG. 10 shows a diagram of a system 1000 including a device 1005 that supports beam selection in handheld wireless communications devices in accordance with aspects of the present disclosure. The device 1005 may be an example of or include the components of device 705, device 805, or a UE 115 as described herein. The device 1005 may include components for bi-directional voice and data communications including components for transmitting and receiving communications, including a beam manager 1010, an I/O controller 1015, a transceiver 1020, an antenna 1025, memory 1030, and a processor 1040. These components may be in electronic communication via one or more buses (e.g., bus 1045).

The beam manager 1010 may perform transmission or receive beam measurements at two or more wireless antennas of the device 1005, select a serving beam pair based at least in part on the transmission or receive beam measurements, and present an indication at the device 1005 corresponding to the selected serving beam pair.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1005 may include a single antenna 1025. However, in some cases the device 1005 may have more than one antenna 1025, which may be capable of concurrently transmitting or receiving multiple wireless transmissions. Each antenna 1025 may comprise one or more phasors.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam selection in handheld wireless communications devices).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
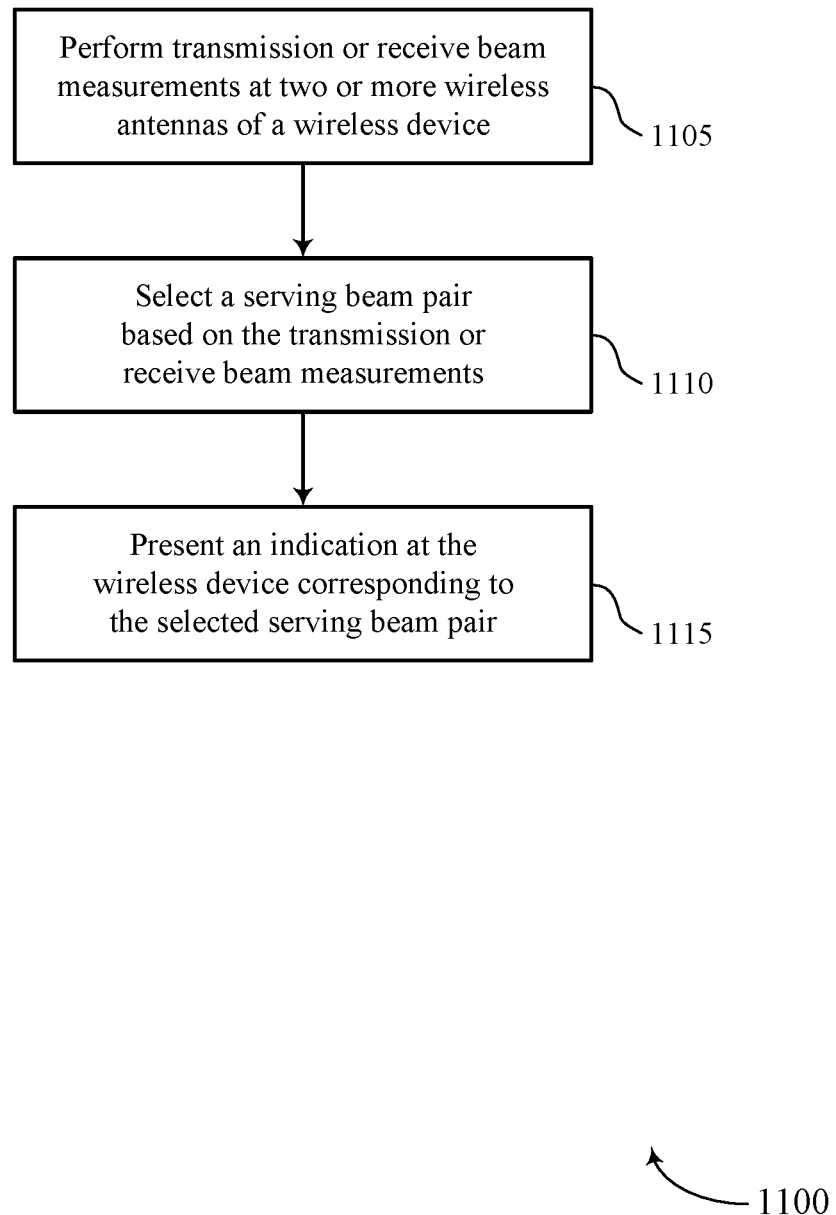
FIGS. 11 through 14 show flowcharts illustrating methods that support beam selection in handheld wireless communications devices in accordance with aspects of the present disclosure.

FIG. 11 shows a flowchart illustrating a method 1100 that supports beam selection in handheld wireless communications devices in accordance with aspects of the present disclosure. The operations of method 1100 may be implemented by a UE 111 or its components as described herein. For example, the operations of method 1100 may be performed by a beam manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may perform transmission or receive beam measurements at two or more wireless antennas of a wireless device. The operations of 1105 may be performed according to the methods described herein. In some examples, aspects of the operations of 1105 may be performed by a beam measurement manager as described with reference to FIGS. 7 through 10.

At 1110, the UE may select a serving beam pair based at least in part on the transmission or receive beam measurements. The operations of 1110 may be performed according to the methods described herein. In some examples, aspects of the operations of 1110 may be performed by a beam selector as described with reference to FIGS. 7 through 10.

At 1115, the UE may present an indication at the wireless device corresponding to the selected serving beam pair. The operations of 1115 may be performed according to the methods described herein. In some examples, aspects of the operations of 1115 may be performed by a notification manager as described with reference to FIGS. 7 through 10.

Figure 12:
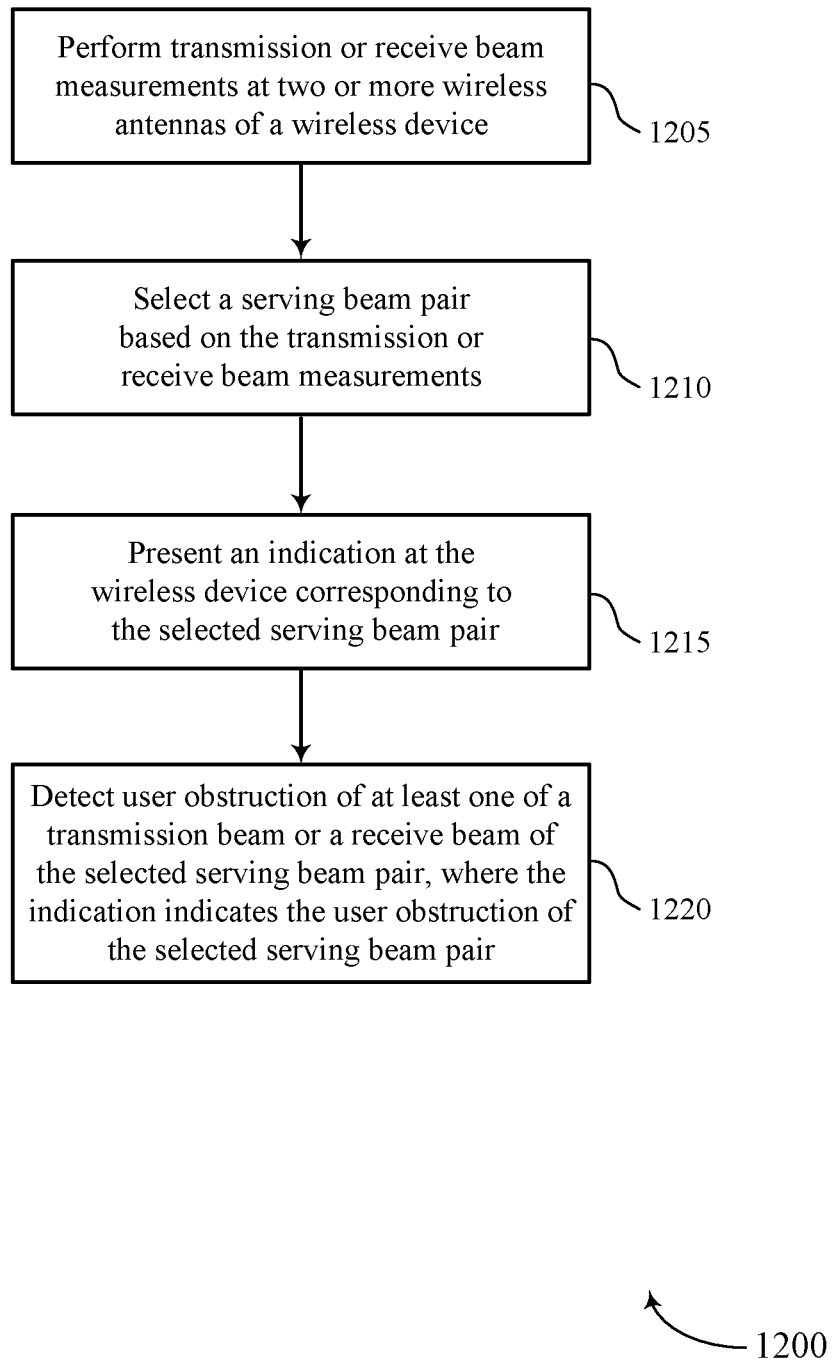

FIG. 12 shows a flowchart illustrating a method 1200 that supports beam selection in handheld wireless communications devices in accordance with aspects of the present disclosure. The operations of method 1200 may be implemented by a UE 115 or its components as described herein. For example, the operations of method 1200 may be performed by a beam manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may perform transmission or receive beam measurements at two or more wireless antennas of a wireless device. The operations of 1205 may be performed according to the methods described herein. In some examples, aspects of the operations of 1205 may be performed by a beam measurement manager as described with reference to FIGS. 7 through 10.

At 1210, the UE may select a serving beam pair based at least in part on the transmission or receive beam measurements. The operations of 1210 may be performed according to the methods described herein. In some examples, aspects of the operations of 1210 may be performed by a beam selector as described with reference to FIGS. 7 through 10.

At 1215, the UE may present an indication at the wireless device corresponding to the selected serving beam pair. The operations of 1215 may be performed according to the methods described herein. In some examples, aspects of the operations of 1215 may be performed by a notification manager as described with reference to FIGS. 7 through 10.

At 1220, the UE may detect user obstruction of at least one of a transmission beam or a receive beam of the selected serving beam pair, where the indication indicates the user obstruction of the selected serving beam pair. The operations of 1220 may be performed according to the methods described herein. In some examples, aspects of the operations of 1220 may be performed by an obstruction detector as described with reference to FIGS. 7 through 10.

Figure 13:
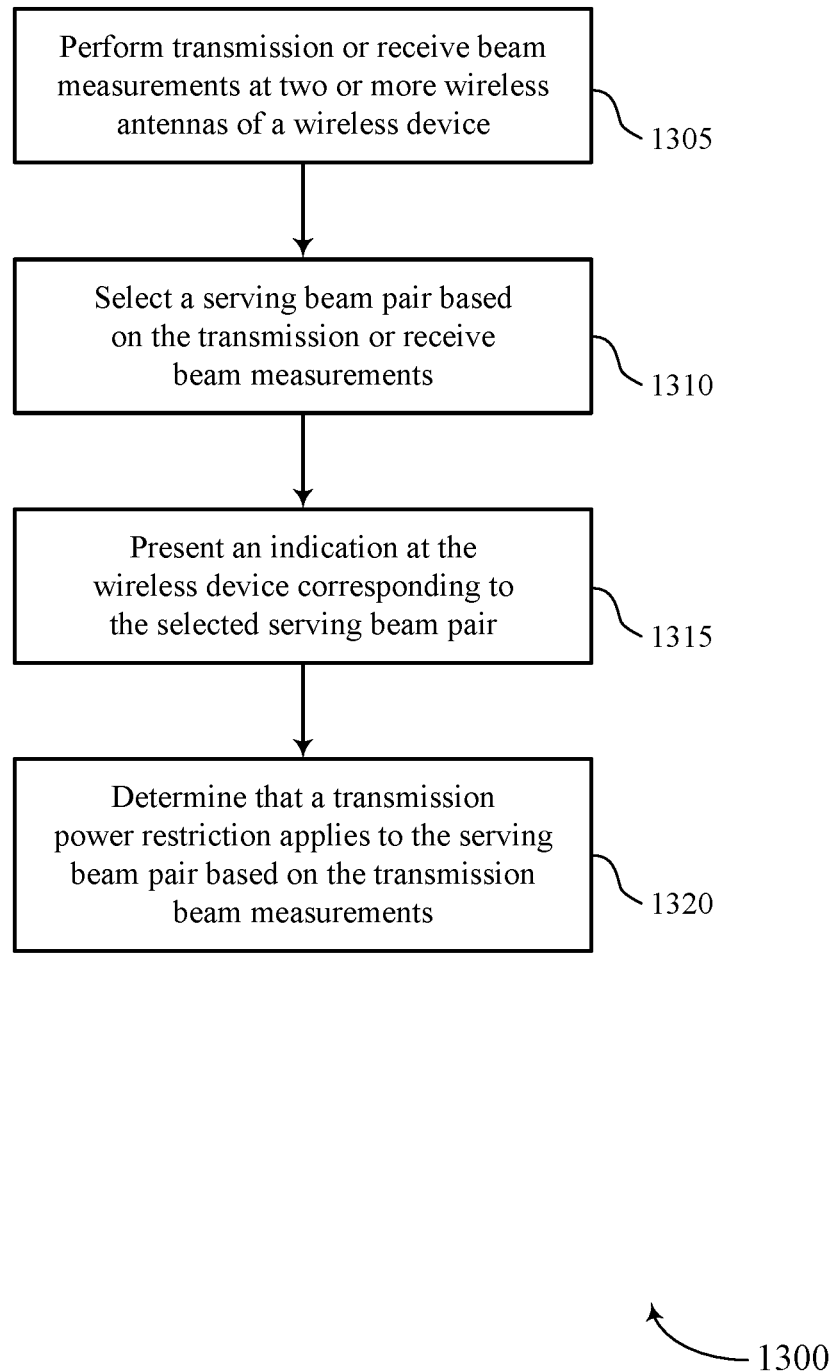

FIG. 13 shows a flowchart illustrating a method 1300 that supports beam selection in handheld wireless communications devices in accordance with aspects of the present disclosure. The operations of method 1300 may be implemented by a UE 115 or its components as described herein. For example, the operations of method 1300 may be performed by a beam manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may perform transmission or receive beam measurements at two or more wireless antennas of a wireless device. The operations of 1305 may be performed according to the methods described herein. In some examples, aspects of the operations of 1305 may be performed by a beam measurement manager as described with reference to FIGS. 7 through 10.

At 1310, the UE may select a serving beam pair based at least in part on the transmission or receive beam measurements. The operations of 1310 may be performed according to the methods described herein. In some examples, aspects of the operations of 1310 may be performed by a beam selector as described with reference to FIGS. 7 through 10.

At 1315, the UE may present an indication at the wireless device corresponding to the selected serving beam pair. The operations of 1315 may be performed according to the methods described herein. In some examples, aspects of the operations of 1315 may be performed by a notification manager as described with reference to FIGS. 7 through 10.

At 1320, the UE may determine that a transmission power restriction applies to the serving beam pair based at least in part on the transmission beam measurements. The operations of 1320 may be performed according to the methods described herein. In some examples, aspects of the operations of 1320 may be performed by a beam selector as described with reference to FIGS. 7 through 10.

In one example, the method 1300 further comprises determining a threshold exposure level for a power density exposure, wherein determining that the transmission power restriction applies to the selected serving beam pair further comprises determining that at least one of the transmission beam measurements exceeds the threshold exposure level.

In some examples, the method 1300 further includes determining that the transmission power restriction no longer applies to the selected serving beam pair (e.g., the user has removed the obstruction). In such an example, the wireless device may transmit a wireless signal using the selected serving beam pair. In another example, the method 1300 further includes determining that the transmission power restriction still applies to the selected serving beam pair (e.g., the user has not removed the obstruction). In this case, the method 1300 includes transmitting a wireless signal using a different serving beam pair unrestricted by the transmission power restriction. This is so the wireless device does not transmit using the selected serving beam pair that was obstructed, risking exposing the user to high transmit power levels.

Figure 14:
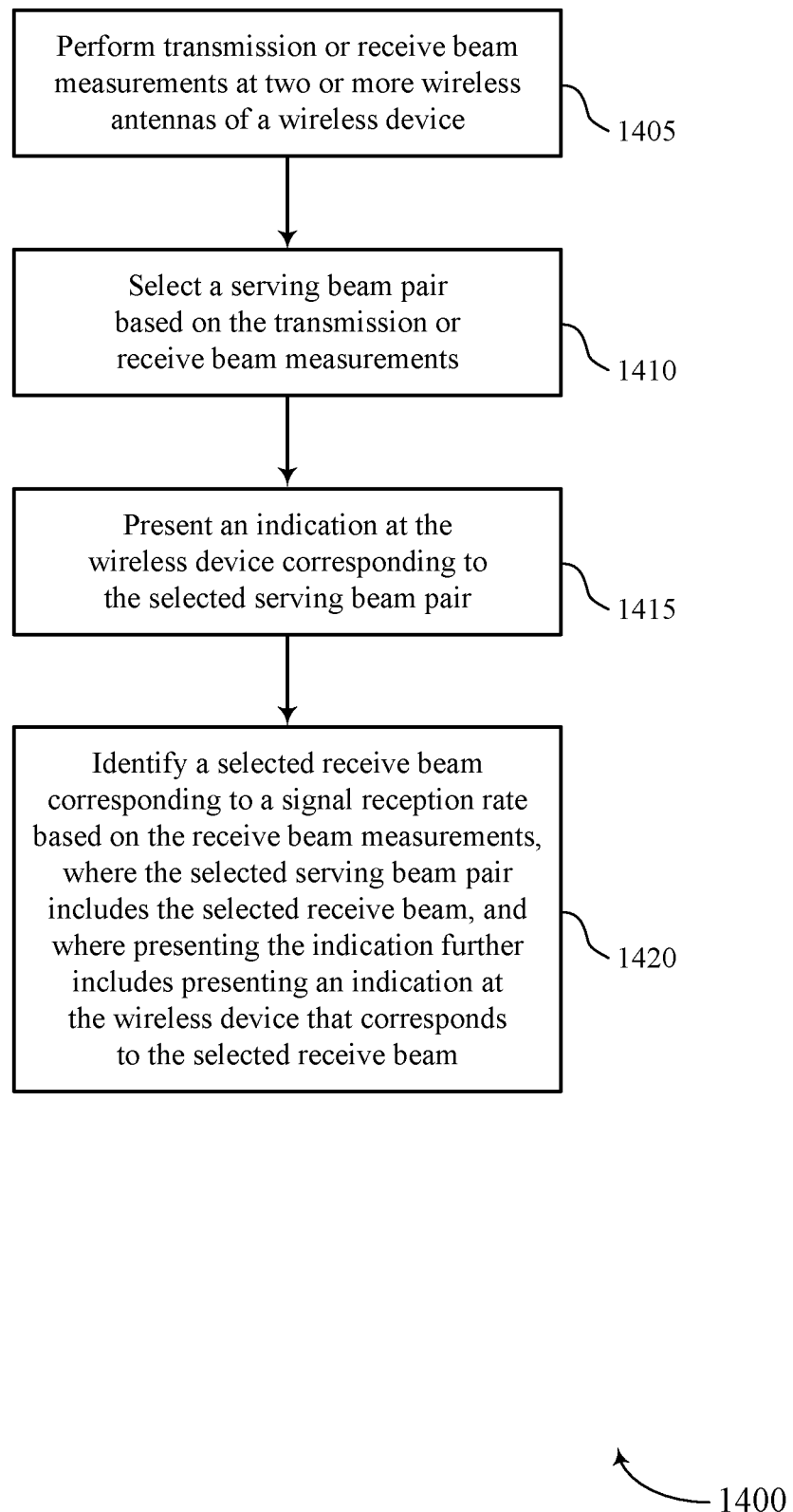

FIG. 14 shows a flowchart illustrating a method 1400 that supports beam selection in handheld wireless communications devices in accordance with aspects of the present disclosure. The operations of method 1400 may be implemented by a UE 115 or its components as described herein. For example, the operations of method 1400 may be performed by a beam manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may perform transmission or receive beam measurements at two or more wireless antennas of a wireless device. The operations of 1405 may be performed according to the methods described herein. In some examples, aspects of the operations of 1405 may be performed by a beam measurement manager as described with reference to FIGS. 7 through 10.

At 1410, the UE may select a serving beam pair based at least in part on the transmission or receive beam measurements. The operations of 1410 may be performed according to the methods described herein. In some examples, aspects of the operations of 1410 may be performed by a beam selector as described with reference to FIGS. 7 through 10.

At 1415, the UE may present an indication at the wireless device corresponding to the selected serving beam pair. The operations of 1415 may be performed according to the methods described herein. In some examples, aspects of the operations of 1415 may be performed by a notification manager as described with reference to FIGS. 7 through 10.

At 1420, the UE may identify a selected receive beam corresponding to a signal reception rate based at least in part on the receive beam measurements, where the selected serving beam pair includes the selected receive beam, and where presenting the indication further includes presenting an indication at the wireless device that corresponds to the selected receive beam. The operations of 1420 may be performed according to the methods described herein. In some examples, aspects of the operations of 1420 may be performed by a wireless device as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Embodiment 1

A method for wireless communication, comprising: performing transmission or receive beam measurements at two or more wireless antennas of a wireless device; selecting a serving beam pair based at least in part on the transmission or receive beam measurements; and presenting an indication at the wireless device corresponding to the selected serving beam pair.

Embodiment 2

The method of embodiment 1, further comprising: detecting user obstruction of at least one of a transmission beam or a receive beam of the selected serving beam pair, wherein the indication indicates the user obstruction of the selected serving beam pair.

Embodiment 3

The method of any of embodiments 1 or 2, wherein selecting the serving beam pair further comprises: selecting a transmission beam and a receive beam based at least in part on performing the transmission beam measurements and the receive beam measurements.

Embodiment 4

The method of any of embodiments 1 to 3, wherein performing the transmission or receive beam measurements further comprises performing the transmission beam measurements, the method further comprising: determining that a transmission power restriction applies to the selected serving beam pair based at least in part on the transmission beam measurements.

Embodiment 5

The method of any of embodiments 1 to 4, further comprising: determining a threshold exposure level for a power density exposure, wherein determining that the transmission power restriction applies to the selected serving beam pair further comprises determining that at least one of the transmission beam measurements exceeds the threshold exposure level.

Embodiment 6

The method of any of embodiments 1 to 5, wherein the threshold exposure level comprises a maximum permissible exposure (MPE), the method further comprising: storing the MPE at the wireless device.

Embodiment 7

The method of any of embodiments 1 to 4, further comprising: determining that the transmission power restriction no longer applies to the selected serving beam pair; and transmitting a wireless signal using the selected serving beam pair.

Embodiment 8

The method of any of embodiments 1 to 4, further comprising: determining that the transmission power restriction still applies to the selected serving beam pair; and transmitting a wireless signal using a different serving beam pair unrestricted by the transmission power restriction.

Embodiment 9

The method of any of embodiments 1 to 8, wherein performing transmission or receive beam measurements further comprises performing the receive beam measurements, the method further comprising: identifying a selected receive beam corresponding to a signal reception rate based at least in part on the receive beam measurements, wherein the selected serving beam pair includes the selected receive beam, and wherein presenting the indication further comprises presenting an indication at the wireless device that corresponds to the selected receive beam.

Embodiment 10

The method of any of embodiments 1 to 9, wherein performing the transmission or receive beam measurements further comprises performing the transmission beam measurements, the method further comprising: determining, based at least in part on the transmission beam measurements, that a transmission power restriction applies to the selected serving beam pair based at least in part on detecting physical contact near a first antenna associated with the selected serving beam pair.

Embodiment 11

The method of any of embodiments 1 to 10, wherein the indication is an image output on a visual display of the wireless device, and wherein the image indicates that a user is in physical contact with the wireless device near the selected serving beam pair.

Embodiment 12

The method of any of embodiments 1 to 11, wherein the indication is an image output on a visual display of the wireless device, and wherein the image comprises an indication of a way to hold the wireless device that does not block the selected serving beam pair, an indicator related to radio frequency conditions, a signal strength indicator, a best beam path indicator, a suggested orientation of the wireless device, or combinations thereof.

Embodiment 13

The method of any of embodiments 1 to 12, wherein performing the transmission or receive beam measurements further comprises: periodically performing the transmission or receive beam measurements.

Embodiment 14

The method of any of embodiments 1 to 13, wherein the selected serving beam pair is a first selected serving beam pair, further comprising: selecting a second serving beam pair associated with a second highest throughput value based at least in part on the transmission or receive beam measurements; and transmitting a wireless signal using the second serving beam pair.

Embodiment 15

The method of any of embodiments 1 to 14, wherein performing the transmission or receive beam measurements further comprises: measuring transmission throughput for one or more phasors of each of the two or more antennas of the wireless device.

Embodiment 16

The method of any of embodiments 1 to 15, further comprising: determining a data throughput level for transmissions at the wireless device; and comparing the data throughput level to a threshold data throughput level, wherein providing the indication at the wireless device is further based at least in part on the data throughput level being less than the threshold data throughput level.

Embodiment 17

The method of any of embodiments 1 to 16, further comprising: determining that a battery level does not satisfy a battery threshold level, wherein providing the indication at the wireless device is further based at least in part on the battery level not satisfying the battery threshold level.

Embodiment 18

The method of any of embodiments 1 to 17, further comprising: determining a temperature of the wireless device, wherein providing the indication at the wireless device is further based at least in part on the temperature of the wireless device.

Embodiment 19

The method of any of embodiments 1 to 18, further comprising: detecting a change in an orientation of the wireless device; and performing the transmission or receive beam measurements in response to detecting the change in the orientation of the wireless device.

Embodiment 20

The method of any of embodiments 1 to 19, wherein the selected serving beam pair is associated with a highest throughput value associated with the transmission or receive beam measurements.

Embodiment 21

An apparatus comprising at least one means for performing a method of any of embodiments 1 to 20.

Embodiment 22

An apparatus for wireless communications comprising a processor; memory in electronic communication with the processor; and instructions stored in the memory and executable by the processor to cause the apparatus to perform a method of any of embodiments 1 to 20.

Embodiment 23

A non-transitory computer-readable medium storing code for wireless communications, the code comprising instructions executable by a processor to perform a method of any of embodiments 1 to 20.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based at least in part on condition A" may be based at least in part on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
   performing transmission or receive beam measurements at two or more wireless antennas of a wireless device;
   selecting a serving beam pair based at least in part on the transmission or receive beam measurements;
   detecting user obstruction of at least one of a transmission beam or a receive beam of the selected serving beam pair; and
   presenting a visual indication at the wireless device that is positioned proximate to an antenna location corresponding to the selected serving beam pair, wherein the visual indication indicates the user obstruction of the selected serving beam pair.

2. The method of claim 1, wherein selecting the serving beam pair further comprises:
   selecting the transmission beam and the receive beam based at least in part on performing the transmission beam measurements and the receive beam measurements.

3. The method of claim 1, wherein performing the transmission or receive beam measurements further comprises performing the transmission beam measurements, the method further comprising:
   determining that a transmission power restriction applies to the selected serving beam pair based at least in part on the transmission beam measurements.

4. The method of claim 3, further comprising:
   determining a threshold exposure level for a power density exposure, wherein determining that the transmission power restriction applies to the selected serving beam pair further comprises determining that at least one of the transmission beam measurements exceeds the threshold exposure level.

5. The method of claim 4, wherein the threshold exposure level comprises a maximum permissible exposure (MPE), the method further comprising:
   storing the MPE at the wireless device.

6. The method of claim 3, further comprising:
   determining that the transmission power restriction no longer applies to the selected serving beam pair; and
   transmitting a wireless signal using the selected serving beam pair.

7. The method of claim 3, further comprising:
   determining that the transmission power restriction still applies to the selected serving beam pair; and
   transmitting a wireless signal using a different serving beam pair unrestricted by the transmission power restriction.

8. The method of claim 1, wherein performing the transmission or receive beam measurements further comprises performing the receive beam measurements, the method further comprising:
identifying a selected receive beam corresponding to a signal reception rate based at least in part on the receive beam measurements, wherein the selected serving beam pair includes the selected receive beam, and wherein presenting the visual indication further comprises presenting the visual indication at the wireless device that corresponds to the selected receive beam.

9. The method of claim 1, wherein performing the transmission or receive beam measurements further comprises performing the transmission beam measurements, the method further comprising:
determining, based at least in part on the transmission beam measurements, that a transmission power restriction applies to the selected serving beam pair based at least in part on detecting physical contact near a first antenna associated with the selected serving beam pair.

10. The method of claim 1, wherein the visual indication includes an image output on a visual display of the wireless device, and wherein the image indicates that a user is in physical contact with the wireless device near the selected serving beam pair.

11. The method of claim 1, wherein the visual indication includes an image output on a visual display of the wireless device, and wherein the image comprises an indication of a way to hold the wireless device that does not block the selected serving beam pair, an indicator related to radio frequency conditions, a signal strength indicator, a best beam path indicator, a suggested orientation of the wireless device, or combinations thereof.

12. The method of claim 1, wherein performing the transmission or receive beam measurements further comprises:
periodically performing the transmission or receive beam measurements.

13. The method of claim 1, wherein the selected serving beam pair is a first selected serving beam pair, further comprising:
selecting a second serving beam pair associated with a second highest throughput value based at least in part on the transmission or receive beam measurements; and
transmitting a wireless signal using the second serving beam pair.

14. The method of claim 1, wherein performing the transmission or receive beam measurements further comprises:
measuring transmission throughput for one or more phasors of each of the two or more wireless antennas of the wireless device.

15. The method of claim 1, further comprising:
determining a data throughput level for transmissions at the wireless device; and
comparing the data throughput level to a threshold data throughput level, wherein providing the visual indication at the wireless device is further based at least in part on the data throughput level being less than the threshold data throughput level.

16. The method of claim 1, further comprising:
determining that a battery level does not satisfy a battery threshold level, wherein providing the visual indication at the wireless device is further based at least in part on the battery level not satisfying the battery threshold level.

17. The method of claim 1, further comprising:
determining a temperature of the wireless device, wherein providing the visual indication at the wireless device is further based at least in part on the temperature of the wireless device.

18. The method of claim 1, further comprising:
detecting a change in an orientation of the wireless device; and
performing the transmission or receive beam measurements in response to detecting the change in the orientation of the wireless device.

19. The method of claim 1, wherein the selected serving beam pair is associated with a highest throughput value associated with the transmission or receive beam measurements.

20. An apparatus for wireless communication, comprising:
a processor,
memory in electronic communication with the processor; and
instructions stored in the memory and executable by the processor to cause the apparatus to:
perform transmission or receive beam measurements at two or more wireless antennas of a wireless device;
select a serving beam pair based at least in part on the transmission or receive beam measurements;
detect user obstruction of at least one of a transmission beam or a receive beam of the selected serving beam pair; and
present a visual indication at the wireless device that is positioned proximate to an antenna location corresponding to the selected serving beam pair, wherein the visual indication indicates the user obstruction of the selected serving beam pair.

21. The apparatus of claim 20, wherein the instructions to select the serving beam pair further are executable by the processor to cause the apparatus to:
select the transmission beam and the receive beam based at least in part on performing the transmission beam measurements and the receive beam measurements.

22. The apparatus of claim 20, wherein perform the transmission or receive beam measurements further comprises performing the transmission beam measurements, and the instructions are further executable by the processor to cause the apparatus to:
determine that a transmission power restriction applies to the selected serving beam pair based at least in part on the transmission beam measurements.

23. The apparatus of claim 22, wherein the instructions are further executable by the processor to cause the apparatus to:
determine a threshold exposure level for a power density exposure, wherein determining that the transmission power restriction applies to the selected serving beam pair further are executable by the processor to cause the apparatus to determine that at least one of the transmission beam measurements exceeds the threshold exposure level.

24. The apparatus of claim 20, wherein performing transmission or receive beam measurements further comprises performing the receive beam measurements, and the instructions are further executable by the processor to cause the apparatus to:
identify a selected receive beam corresponding to a signal reception rate based at least in part on the receive beam measurements, wherein the selected serving beam pair includes the selected receive beam, and wherein presenting the visual indication further are executable by the processor to cause the apparatus to present the visual indication at the wireless device that corresponds to the selected receive beam.

25. An apparatus for wireless communication, comprising:
means for performing transmission or receive beam measurements at two or more wireless antennas of a wireless device;
means for selecting a serving beam pair based at least in part on the transmission or receive beam measurements;
means for detecting user obstruction of at least one of a transmission beam or a receive beam of the selected serving beam pair; and
means for presenting a visual indication at the wireless device that is positioned proximate to an antenna location corresponding to the selected serving beam pair, wherein the visual indication indicates the user obstruction of the selected serving beam pair.

26. The apparatus of claim 25, wherein the means for selecting the serving beam pair further comprises:
means for selecting the transmission beam and the receive beam based at least in part on performing the transmission beam measurements and the receive beam measurements.

27. A non-transitory computer-readable medium storing code for wireless communication, the code comprising instructions executable by a processor to:
perform transmission or receive beam measurements at two or more wireless antennas of a wireless device;
select a serving beam pair based at least in part on the transmission or receive beam measurements;
detect user obstruction of at least one of a transmission beam or a receive beam of the selected serving beam pair; and
present a visual indication at the wireless device that is positioned proximate to an antenna location corresponding to the selected serving beam pair, wherein the visual indication indicates the user obstruction of the selected serving beam pair.

* * * * *